(12) United States Patent (10) Patent No.: US 8,619,648 B2
Guo et al. (45) Date of Patent: *Dec. 31, 2013

(54) MOBILE COMMUNICATION METHOD, MOBILE COMMUNICATION SYSTEM AND ACCESS ENTITY

(71) Applicant: Huawei Technologies Co., Ltd., Guangdong (CN)

(72) Inventors: Xiaolong Guo, Beijing (CN); Lan Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/717,179

(22) Filed: Dec. 17, 2012

(65) Prior Publication Data

US 2013/0115978 A1 May 9, 2013

Related U.S. Application Data

(63) Continuation of application No. 13/396,547, filed on Feb. 14, 2012, now Pat. No. 8,355,346, which is a continuation of application No. 12/434,478, filed on May 1, 2009, now Pat. No. 8,139,505, which is a continuation of application No. PCT/CN2007/070691, filed on Sep. 14, 2007.

(30) Foreign Application Priority Data

Nov. 3, 2006 (CN) .......................... 2006 1 0146106
Dec. 30, 2006 (CN) .......................... 2006 1 0173372
Aug. 15, 2007 (CN) .......................... 2007 1 0138093

(51) Int. Cl.
*H04B 7/00* (2006.01)

(52) U.S. Cl.
USPC ........................... 370/310; 370/349; 370/401

(58) Field of Classification Search
None
See application file for complete search history.

(56) References Cited

U.S. PATENT DOCUMENTS 5,946,619 A 8/1999 Kolev
8,139,505 B2 * 3/2012 Guo et al. ..................... 370/254

(Continued)

FOREIGN PATENT DOCUMENTS

CN 1242916 A 1/2000
CN 1285702 A 2/2001

(Continued)

OTHER PUBLICATIONS

Akyildiz et al., "A Dynamic Location Management Scheme for Next-Generation Multitier PCS Systems," Jan. 2002, IEEE, New York, New York.

(Continued)

*Primary Examiner* — Andrew Chriss
*Assistant Examiner* — Salvador E Rivas
(74) *Attorney, Agent, or Firm* — Leydig, Voit & Mayer, Ltd.

(57) ABSTRACT

An embodiment of the invention provides a communication system. The communication system includes a user equipment which is moving within a coverage of a first network and a second network and is configured to send a location update request to a third access entity of the second network; and the third access entity which is configured to receive the location update request from the user equipment, acquire information of a first access entity of the first network from the location update request and determine whether a predetermined condition is satisfied If the predetermined condition is not satisfied, the user equipment is paged through the first access entity, and if the predetermined condition is satisfied, the user equipment is not paged through the first access entity. As such, the situation that the UE is paged in an area where it is unlikely to appear can be avoided.

4 Claims, 11 Drawing Sheets

(56) References Cited

U.S. PATENT DOCUMENTS

| | | | |
|---|---|---|---|
| 2002/0082029 | A1 | 6/2002 | Ahmad et al. |
| 2003/0203736 | A1 | 10/2003 | Chi et al. |
| 2005/0073977 | A1 | 4/2005 | Vanghi et al. |
| 2005/0192034 | A1 | 9/2005 | Munje |
| 2006/0030299 | A1* | 2/2006 | Wandel ............ 455/412.1 |
| 2008/0069088 | A1* | 3/2008 | Petrovic et al. ........... 370/354 |

FOREIGN PATENT DOCUMENTS

| | | | |
|---|---|---|---|
| CN | 1408183 | A | 4/2003 |
| CN | 1109473 | C | 5/2003 |
| CN | 1567757 | A | 1/2005 |
| CN | 1581996 | A | 2/2005 |
| CN | 1697394 | A | 11/2005 |
| CN | 1764309 | A | 4/2006 |
| CN | 101237671 | A | 8/2006 |
| CN | 1832615 | A | 9/2006 |
| CN | 1992958 | A | 7/2007 |
| EP | 0851703 | A2 | 7/1998 |
| EP | 1079655 | A1 | 2/2001 |
| EP | 1569487 | A1 | 8/2005 |
| WO | WO 9726764 | A1 | 1/1997 |
| WO | WO 9820695 | A2 | 5/1998 |
| WO | WO 0110080 | A2 | 7/2000 |
| WO | WO 2006048697 | A1 | 5/2006 |
| WO | WO 2009024067 | A1 | 2/2009 |

OTHER PUBLICATIONS

Extended European Search Report in corresponding PCT Patent Application No. 07801099.8 (May 7, 2010).

1st Office Action in corresponding European Patent Application No. 07801099.8 (Feb. 1, 2012).

Written Opinion of the International Searching Authority in corresponding PCT Patent Application No. PCT/CN2007/070691 (Dec. 27, 2007).

Written Opinion of the International Searching Authority in corresponding PCT Patent Application No. PCT/CN2008/071998 (Nov. 27, 2008).

International Search Report in corresponding PCT Patent Application No. PCT/CN2007/070691 (Dec. 27, 2007).

Notice of Allowance in corresponding U.S. Appl. No. 12/434,478 (Nov. 15, 2011).

Notice of Allowance in corresponding U.S. Appl. No. 13/396,547 (Sep. 13, 2012).

1st Office Action in corresponding U.S. Appl. No. 12/434,478 (Apr. 15, 2011).

1st Office Action in corresponding U.S. Appl. No. 13/396,547 (May 14, 2012).

1st Office Action in corresponding Chinese Patent Application No. 200610173372.X (Mar. 31, 2010).

1st Office Action in corresponding Chinese Patent Application No. 200710138093.4 (Dec. 24, 2010).

2nd nd Office Action in corresponding Chinese Patent Application No. 200780036788.X (Jan. 19, 2011).

1st Office Action in corresponding Chinese Patent Application No. 200780036788.X (Jun. 8, 2010).

International Search Report in corresponding PCT Patent Application No. PCT/CN2008/071998 (Nov. 27, 2008).

"Technical Specification Group Services and System Aspects; 3GPP System Architecture Evolution: Report on Technical Options and Conclusions (Release 7)," 3GPP TR 23.882, Oct. 2006, Version 1.4.2, 3GPP, Valbonne, France.

"3GPP Organizational Partners; 3GPP System Architecture Evolution: Report on Technical Options and Conclusions," 3GPP TR23/882, Dec. 31, 2005, Version 0.9.0, 3GPP, Valbonne, France.

Extended European Search Report in corresponding European Patent Application No. 12191839.5 (Mar. 28, 2013).

* cited by examiner

MOBILE COMMUNICATION METHOD, MOBILE COMMUNICATION SYSTEM AND ACCESS ENTITY

CROSS REFERENCE TO RELATED APPLICATIONS

This application is a continuation of U.S. patent application Ser. No. 13/396,547 filed on Feb. 14, 2012, which is a continuation of U.S. patent application Ser. No. 12/434,478 filed on May 1, 2009, which is a continuation of International Patent Application No. PCT/CN2007/070691, filed on Sep. 14, 2007. The International Application claims the priority to Chinese Patent Application No. 200610146106.8, filed on Nov. 3, 2006, Chinese Patent Application No. 200610173372.X, filed on Dec. 30, 2006, and Chinese Patent Application No. 200710138093.4, filed on Aug. 15, 2007. All of the aforementioned patent applications are hereby incorporated by reference in their entirety.

FIELD OF THE INVENTION

The present invention relates to communication field, and more specifically, to a mobile communication method, mobile communication system and access entity.

BACKGROUND

Third Generation mobile communication technology (3G) generally refers to a new generation of a mobile communication system that integrates multimedia communications, such as integrating wireless communication and Internet-based communication. Such a mobile communication system is able to process various types of media data streams such as image, music, video streams and provide various information services such as web page browsing, teleconference, and e-commerce. With the development of the communication technology, people are setting more and more demanding requirements for the mobile communication. The network architecture and protocols of the existing $3^{rd}$ Generation Partnership Project (3GPP) no longer satisfy users' high demand for mobile communication. Accordingly, 3GPP proposed a concept of an evolved network for fulfilling future communication requirements.

In particular, to ensure the competitive edge of the 3GPP in the further development, especially the capability of the 3GPP system for processing rapidly increasing IP (Internet protocol) data services, the 3GPP has launched a Long Term Evolution (LTE) program and a System Architecture Evolution (SAE) program. The purpose of the LTE is to provide an evolved communication network (such as an SAE network or a LTE network) which can reduce time delay, increase user data rate, enhance system capability and coverage, and save overall cost of operators of the network. Meanwhile, the backward compatibility of the evolved network structure toward the existing network is also an important factor to consider.

The evolved network structure meets the following requirements:

(1) a basic IP connection needs to be set up in the evolved network during an initial stage when a user equipment accesses the network;

(2) the evolved network structure must minimize the delay of the user data; and (3) each function module in the evolved network architecture should be defined in such a way to avoid functional overlapping or repetition so as to avoid unnecessary signaling and time delay.

FIG. 1 illustrates a general network architecture derived from the above requirements. The network architecture mainly includes four logic function modules: a Mobility Management Entity (MME), a user plane entity (UPE) gateway (which is a Serving Gateways (S-GW) or an integrated gateway including a Serving GW and a PDN Gateway (P-GW)), an LTE Radio Access Network (LTE RAN), and a Home Subscriber Server (HSS). The MME is a mobility management module responsible for mobility management for a control plane. The mobility management includes management for user context and mobility state, assignment of information such as user temporary identity, mobility state, tracking area (TA), and verification of user identity. The MME corresponds to a control plane of a Serving GPRS Support Node (SGSN) in the Universal Mobile Telecommunications System (UMTS). The S-GW is responsible for initiating paging downstream data of a user equipment (UE) in an idle mode, managing and storing UE context, IP bearer parameters and routing information in the network, and managing UE's mobility control plane anchor and user plane anchor functions between the 3G and the SAE network. The S-GW corresponds to a data plane of SGSN in the current UMTS. The P-GW is responsible for a user anchor function that UE accesses the packet data network. The P-GW has packet routing and forwarding functions and is responsible for policy charging enhancement, packet filtering function based on each user, and is coupled to the S-GW to carry and deliver control information such as create/modify/delete. The LTE RAN is a radio access network for the evolved network. The nodes therein are not defined specifically. Generally, the LTE RAN includes an evolved base station (eNodeB), and may also include a control plane server (CPS) logic entity. In a logic sense, the LTE RAN can be treated as a Long Term Evolution Radio Access Network (LTE-RAN) entity.

Since network structures adopting different radio access technologies (RATs) may exist simultaneously in a real application, network registration procedures may be aroused in a "ping-pang" manner due to the change between different networks when the UE is moving between different RATs (e.g., between a conventional network (i.e. a 2G/3G network) and an evolution network such as an SAE network). As illustrated in FIG. 2, a Routing Area 1 (RA1) and a Routing Area 2 (RA2) are routing areas for an existing 2G/3G network. The UE of the existing 2G/3G network always initiates a Routing Area Update (RAU) procedure when switching a routing area (RA). Of course, even if UE does not switch RA, there is also a periodic location update procedure, the function of which is to inform the network that the UE is still in the network currently so as to prevent the network from keeping paging the UE without knowing that the UE leaves the network. A network registration procedure due to the movement of the UE is now illustrated below.

In FIG. 2, TA1, TA2, TA3, TA4 are tracking areas in the evolved network. TA is similar to RA in the 2G/3G network. When a multi-mode UE is moving between different RA and TA, to ensure that the UE can be paged in networks adopting different RATs, the UE needs to register with RA and TA that it enters. If the UE enters RA1, the UE needs to register with the SGSN of the 2G/3G network. When the UE enters TA1, the UE further needs to register with the MME of the evolved network. When the UE exits TA1 and re-enters RA1, the UE needs to register with the SGSN of the 2G/3G network again. However, the method results in frequent network registration procedures for ensuring paging, causing thereby considerable consumption of the registration signaling.

To solve this problem, various methods in conventional arts have been proposed to avoid frequent network registrations and a severe waste in the air-interfaces.

Currently, a schema for lessening the registration/update influence on air-interfaces is imposed by UE in the idle mode when entering networks with different RATs. The idea of the schema is that the UE registers with an access network (a 2G/3G network or an evolved network) after the UE attaches to the network. Then, the UE registers with another access network when the UE moves to the other access network. As such, the UE may register with both access networks. After that, when the UE moves between corresponding RAs or TAs of these two networks, the UE may not initiate any registration procedure. Both the access entities in these two access networks with which the UE registers contain corresponding UE context.

Now, the procedure of the UE first attaching to the SAE and then moving to the 2G/3G network is illustrated below.

As illustrated in FIG. 3, at step 301, the UE attaches to the SAE, sending an "attach request" message to the MME.

At step 302, the MME may acquire context from the HSS and initiate an authentication procedure with the UE.

At step 303, the UE returns an authentication response to the MME. If the authentication passes, it indicates that the UE has registered with the MME successfully. The MME assigns an SAE temporary mobile subscriber identity (S-TMSI)/SAE routing area (S-RA, i.e., TA) and a default IP address to the UE. The S-TMSI denotes a temporary mobile subscriber identity of the SAE network. The S-RA demotes the RA of the SAE, i.e., TA.

At steps 304 and 304', the MME may register with the HSS (if the MME already contains the UE context, there is no need for the MME to acquire the context from the HSS).

At step 305, the MME confirms that the UE has attached to the network successfully and allows the UE to enter. The MME assigns a S-TMSI/S-RA to the UE and sends information of the default IP address to the UE.

At step 306, after the UE switches from a different RAT to the 2G/3G network, the UE initiates an RAU procedure and carries a S-TMSI/S-RA assigned by the MME to the SGSN (and may also carry parameters such as TMSI/RA assigned by the SGSN).

At steps 307 and 307', the SGSN may send an SGSN Context Request message to an associated MME to request the UE context. After the MME receives the request message, the MME sends the associated context to the SGSN. Such procedure is referred to as a Context Retrieval procedure.

At step 308, authentication procedure may be performed. The SGSN may register with the HSS, as illustrated in steps 309 and 309' (the SGSN may not register with HSS, but may treat the MME as the HSS).

At step 310, the SGSN confirms the receipt of the context and may trigger the MME to transfer data.

At step 311 and 311', the SGSN may update Packet Data Protocol (PDP) context with the MME because the MME, at the user plane, is similar to an original GPRS Gateway Support Node (GGSN).

At step 312, the SGSN assigns U-TMSI (UMTS TMSI, Temporary Mobile Subscriber Identity of UMTS)/U-RA (Routing Area of UMTS) and S-TMSI/S-RA to the UE. After that, no update registration message needs to be sent when the UE moves between U-RA and S-RA. The U-TMSI denotes a temporary mobile subscriber identity of the 2G/3G network. U-RA demotes the RA of the 2G/3G network.

At step 313, the UE returns an RAU completion message.

The procedure that the UE first attaches to the 2G/3G network and then moves to the SAE network is similar to the procedure that the UE first attaches to the SAE network and then moves to the 2G/3G network as illustrated in FIG. 4, which will not be detailed herein.

Briefly, the UE first attaches to the SGSN. The SGSN registers with the HSS. Then, the UE enters the SAE network and initiates a RAU and retrieves context from the SGSN. The MME registers with the HSS and assigns a S-RA/S-TMSI to the UE. The UE does not need to initiate a location update/registration message when moving between the registered RA and S-RA (in terms of TA, RA, the UE may be assigned with a plurality of areas of the SAE network or the 2G/3G network, such as several S-RAs. Then, the UE does not need to initiate the update message when moving between the registered areas assigned by the networks). When the UE moves to areas beyond registered S-RA/RA, the UE needs to initiate an update message. It should be noted that if the SGSN is not replaced, the SGSN registration procedure may be unnecessary.

It is discovered that the above schema encounters at least the following issues in practical application. The network side may page the UE in an unnecessary paging area, reducing efficiency for paging the UE.

The root cause behind such problem is that in the current registration procedure, after the UE enters an RAT network, the UE performs registration and is assigned with TA/RA of the RAT network. After the UE enters another RAT network, the UE initiates an update procedure and is assigned with RA/TA of another RAT network. Then, the UE does not need to initiate the update procedure when moving between the registered RA and TA. When the UE enters a new RA or TA, the UE needs to initiate an update message. The SGSN/MME of the new RA/TA establishes an association with an access entity (MME/SGSN) of another RAT network. Accordingly, the UE does not need to initiate an update message when moving between the new RA/TA and the TA/RA assigned by the access entity of another RAT network.

As illustrated in FIG. 5, the TA is a registered area of the SAE network while RA is a registered area of the UMTS. According to the current schema, the UE registers with the MME when entering TA1 and initiates an UMTS location update after entering the RA1 and registers with the SGSN. Then, the UE does not need to initiate a location update procedure when moving between TA1 and RA1. As such, location update procedures due to ping-pang movement between two RAT networks can be saved. That is, the notion of the TA may help to avoid ping-pang update due to different TAs in one RAT.

After UE moves to RA2, the UE initiates a location update. Then, the UE does not need to initiate a location update procedure between TA1 and RA2 (when UE moves back to RA1, the UE still needs to initiate a location update. After that, the UE does not need to initiate a location update when moving between TA1 and RA1).

If the UE does not need to initiate a location update procedure when moving between TA1 and RA2, and the UE will initiate a location update procedure again when moving back from TA1 to TA2. After that, the UE does not need to initiate a location update procedure when moving between TA2 and RA2.

Likewise, when the UE moves to TA3, TA4 till TA5 again, the UE does not need to initiate a location update procedure when finally moving between TA5 and RA2.

However, it can be seen from the FIG. 5 that it is impossible for the UE to move directly between the TA5 and the RA2. In addition, the MME managing the TA5 may not be associated with the SGSN managing the RA2 (e.g., the MME and the SGSN belong to different Public Land Mobile Networks, and have no roaming interface, or due to distance reason, the "associable SGSN list" configured on the MME does not include SGSN which the RA2 belongs to). Therefore, a signaling procedure between the TA5 and the RA2 is not necessary. Since the UE can only enter an area around the TA5 in a next step and the UE is unlikely to enter the RA2, it is meaningless to associate the SGSN of the RA2 with the MME of the TA5. However, the RA2 still needs to be paged during a paging period, which may cause a mass of paging and reduce efficiency for paging the UE.

Alternatively, in practice, the UMTS is an all-covered network. The SAE is a network covering hot spots, as illustrated in FIG. 6. After UE registers with TA1 and RA1, the UE moves from RA1 to RA2 and to RA3. The UE does not need to initiate an update procedure when moving between TA1 and RA3. Alternatively, after UE registers with TA1 and RA1, the UE moves from TA1 to TA2 and to TA3 and to TA4. Then, the UE does not need to initiate an update procedure when moving between RA1 and TA4.

Usually, the area with which the UE registers (after registering with two different RAT networks) is referred to as UE registered area or non-update area. With no optimization such as priority residence, the paging area of the UE is the UE registered area (non-update area). However, actually, since the UE may not move directly between these two RA/TA (location update procedure is bound to be incurred during moving), the necessary paging area of UE is just the registered area of the RAT network where the UE currently locates. Therefore, the network side may page UE in an unnecessary paging area, reducing efficiency for paging UE.

After ISR (Idle mode Signaling Reduction) is activated, the HSS may record entity information of two systems. That is, the HSS may record information of SGSN and MME with which the UE registers, i.e., dual registration. However, single registration refers to that the HSS may only record information of the entity in one system after ISR is activated (i.e., record the information of the entity with which UE initiates the update most recently). However, information of entities in other system with which the UE registers is stored in another system entity. If the UE first registers with the 2G/3G network first, then the HSS records information of SGSN with which the UE registers (a location update message is sent to HSS via SGSN). When UE moves to another RAT i.e. the SAE system and initiates a location update, the UE again registers with MME in the SAE system. The ISR is then activated. Also, the MME sends a location update to HSS. The HSS records the information of MME and deletes the information of SGSN. However, the information of SGSN is stored in the MME. The SGSN and the MME all record UE information. However, the HSS only saves entity information of one system.

SUMMARY OF THE INVENTION

In view of this, the present invention provides a mobile communication method, a mobile communication system and an access entity so as to improve the efficiency for paging UE.

In a first aspect of the invention, a system is provided according to one embodiment of the present invention.

The system is implemented in a scenario where a user equipment is moving within a coverage of a first network and a second network, wherein the user equipment is registered with both a first access entity of the first network and a second access entity of the second network, and a first association is established between the first access entity and the second access entity so that when the user equipment needs to be paged, the user equipment is paged in a paging area administered by the first access entity and a paging area administered by the second access entity according to the first association.

The system includes:
the user equipment, configured to send a location update request to a third access entity of the second network; and
the third access entity, configured to receive the location update request from the user equipment, acquire information of the first access entity from the location update request and determine whether a predetermined condition is satisfied.

The predetermined condition includes one or more of the following:
a distance between an area where the user equipment is currently located and the paging area administered by the first access entity exceeds a predetermined threshold;
the third access entity cannot be associated with the first access entity; and
the speed of the user equipment in a current access entity system is lower than a threshold.

If the predetermined condition is not satisfied the user equipment is paged through the first access entity, and if the predetermined condition is satisfied, the user equipment is not paged through the first access entity.

In a second aspect of the invention, a method is provided. The method is for use in a scenario where a user equipment is moving within a coverage of a first network and a second network is provided according to one embodiment of the present invention, wherein the user equipment is registered with both a first access entity of the first network and a second access entity of the second network, and a first association is established between the first access entity and the second access entity so that when the user equipment needs to be paged, the user equipment is paged in a paging area administered by the first access entity and a paging area administered by the second access entity according to the first association.

The method includes:
sending, by the user equipment, a location update request to a third access entity of the second network.

The location update request triggers the third access entity to acquire information of the first access entity from the location update request and determine whether a predetermined condition is satisfied.

The predetermined condition comprises one or more of the following:
a distance between an area where the user equipment currently locates and the paging area administered by the first access entity exceeds a predetermined threshold;
the third access entity cannot be associated with the first access entity; and
the speed of the user equipment in a current access entity system is lower than a threshold.

If the predetermined condition is not satisfied, the user equipment is paged through the first access entity; and if the predetermined condition is satisfied, the user equipment is not paged through the first access entity.

In the third aspect of the invention, a user equipment is provided according to one embodiment of the present invention. The user equipment is moving within a coverage of a first network and a second network, and is registered with both a first access entity of the first network and a second access entity of the second network; wherein a first association is established between the first access entity and the second access entity so that when the user equipment needs to be paged, the user equipment is paged in a paging area administered by the first access entity and a paging area administered by the second access entity according to the first association.

The user equipment includes:

a transmitter, configured to send a location update request to a third access entity of the second network.

The location update request triggers the third access entity to acquire information of the first access entity from the location update request and determine whether a predetermined condition is satisfied.

The predetermined condition comprises one or more of the following:

a distance between an area where the user equipment currently locates and the paging area administered by the first access entity exceeds a predetermined threshold;

the third access entity cannot be associated with the first access entity; and the speed of the user equipment in a current access entity system is lower than a threshold.

If the predetermined condition is not satisfied, the user equipment is paged through the first access entity; and if the predetermined condition is satisfied, the user equipment is not paged through the first access entity.

By comparison, the difference between the technical solutions of the present invention and the prior art lies in that, in the process of the access entity performing a location update for the UE or performing a UE access procedure, the present invention may include determining whether or not the area which the UE currently locates satisfies a predetermined condition. If the predetermined condition is met, the UE is paged in a paging area administered by the access entity and it is prohibited to page the UE in the paging area administered by the originally associated access entity in the other network when the UE needs to be paged. As such, the situation that the UE is paged in an area where it is unlikely to appear can be avoided, so that the efficiency for paging the UE is improved.

DETAILED DESCRIPTION

Figure 1:
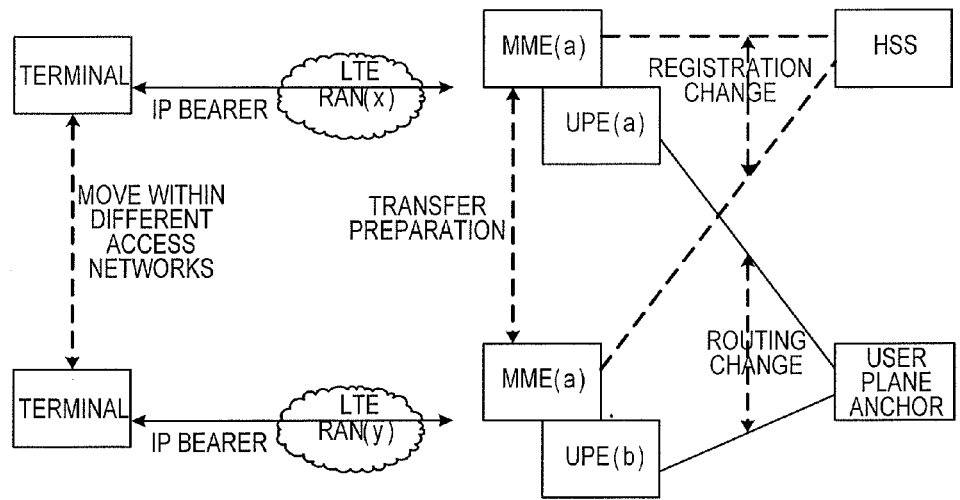
FIG. 1 is a conventional architecture of an evolved network.
Figure 2:
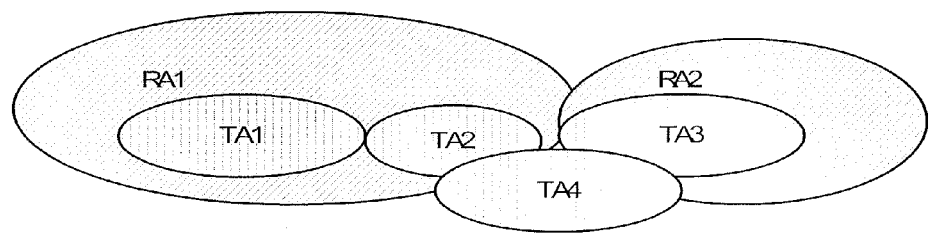
FIG. 2 is a conventional network structure adopting different RATs at the same time.
Figure 3:
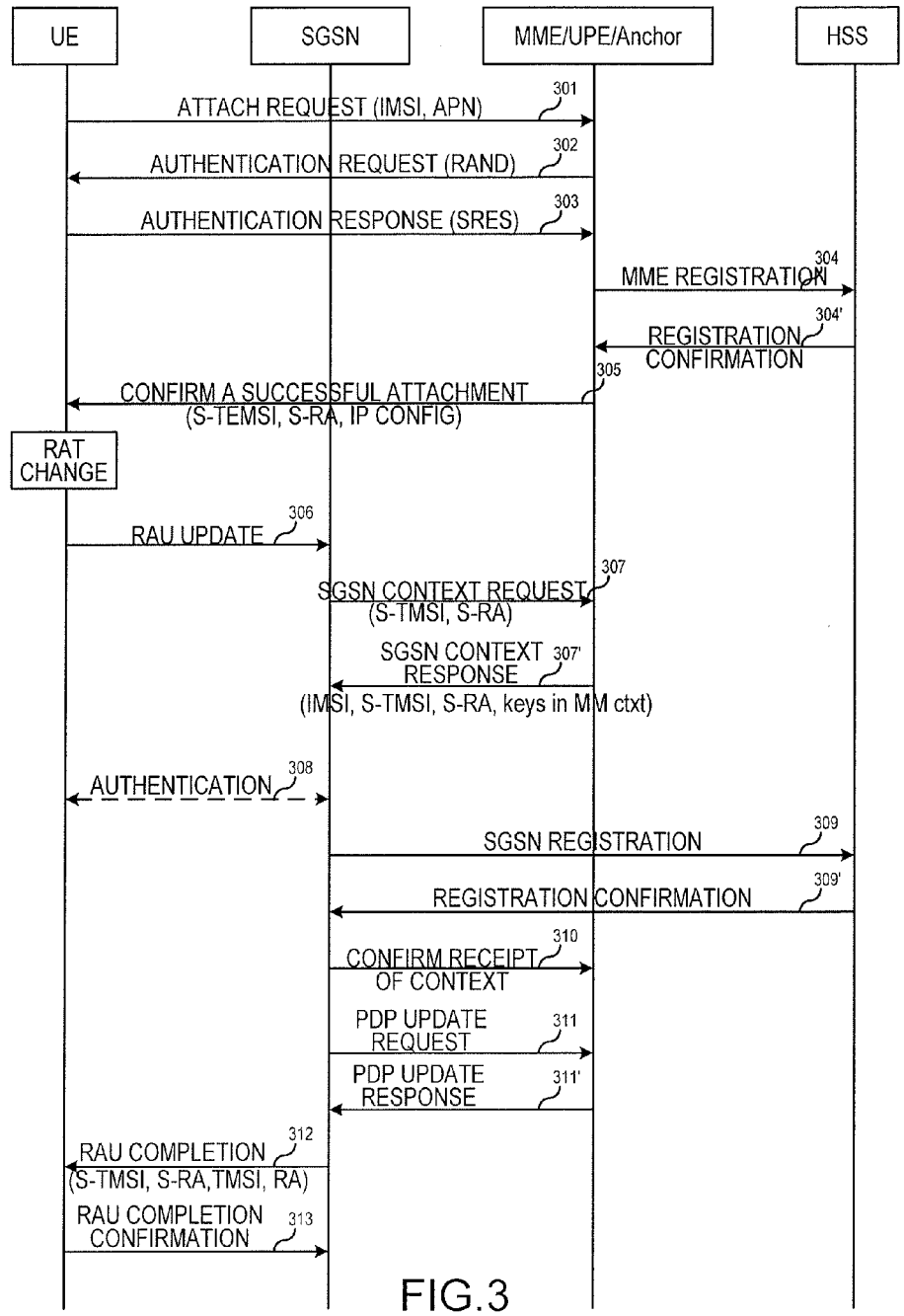
FIG. 3 is a conventional registration procedure of a UE first attaching to a SAE network and then moving to a 2G/3G network.
Figure 4:
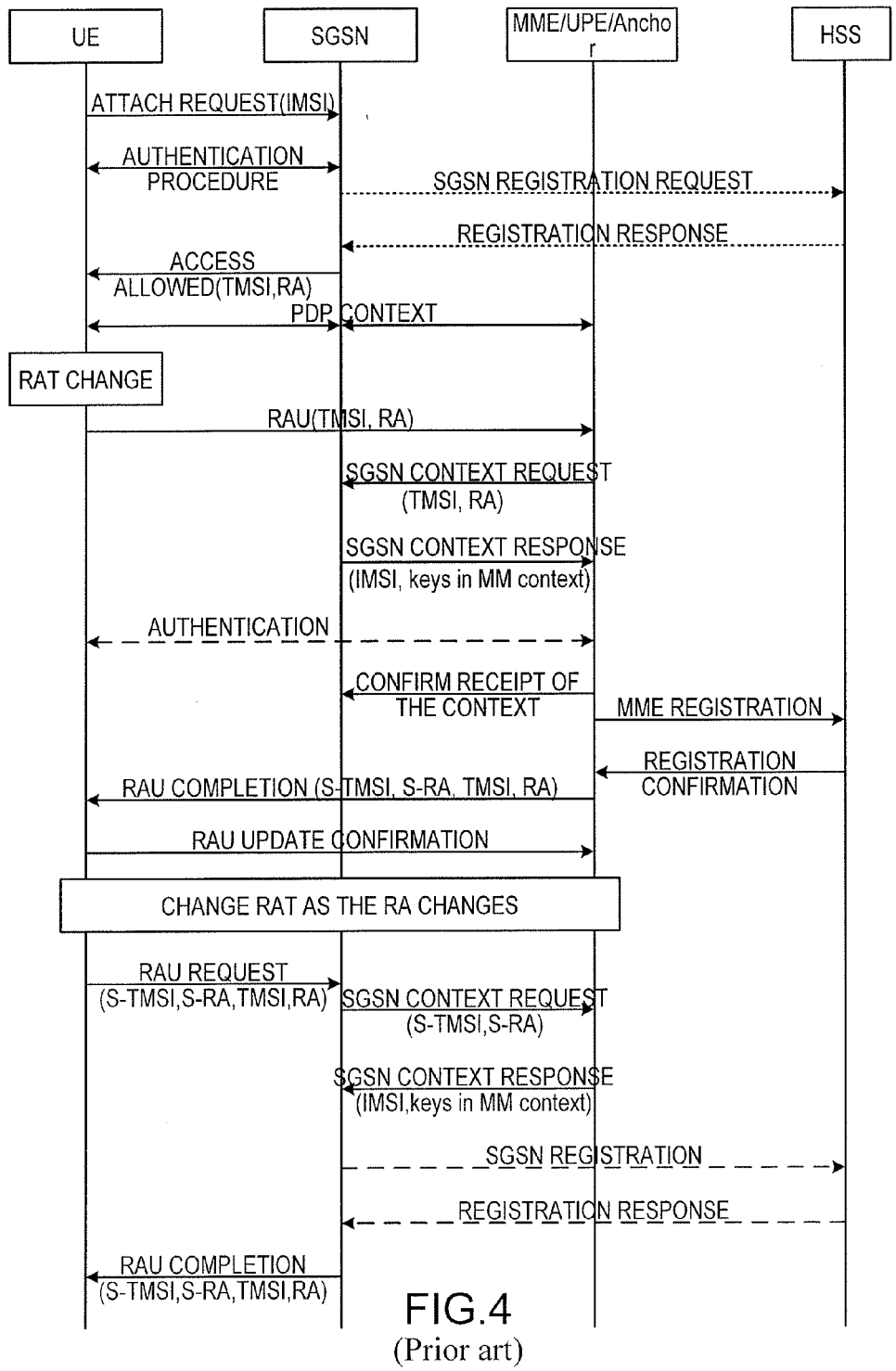
FIG. 4 is a conventional registration procedure of a UE first attaching to a 2G/3G network and then moving to a SAE network.

Illustrations are made to embodiments of the present invention in connection with the accompanying drawings.

In one embodiment of the present invention, when UE is moving in two networks with different RATs, the UE may register respectively with access entities in the two networks. These two access entities are associated with each other. When the UE moves to a new TA or RA and initiates a TAU (tracking area update) or RAU (routing area update) procedure or other access procedures (e.g., service request, paging response, periodic location update, PDP context activation), the access entity in the area where the UE currently locates determines based on the area where the UE currently locates whether a predetermined condition is met. If the predetermined condition is met and when the UE needs to be paged, the UE is paged in the paging area administered by the access entity and it is prohibited to page the UE in the paging area administered by the originally associated another access entity in the other network. Such a predetermined condition may be that a distance between the area where the UE currently locates and a paging area administered by another access entity originally associated with the area where the UE currently locates is above a predetermined threshold; or these two areas are not adjacent to each other; or the access entity in the area where the UE currently locates cannot to be associated with the another access entity; or the time that UE stays in the current area reaches a time threshold. The predetermined condition is triggered by time or events (e.g., location update, terminal initiating a Mobile Originated Call (MOC), mobile station termination initiating a Mobile Terminating Call, etc.). If the access entity in the area where the UE currently locates determines, based on the area where the UE currently locates, that the predetermined condition is not met, then, when the UE needs to be paged, the UE is paged in a paging area administered by the access entity in the area where the UE currently locates and a paging area administered by the originally associated access entity in another network.

With the TA, RA concept, the UE may be assigned with a plurality of areas in the SAE network or the 2G/3G network. If a plurality of S-RAs are assigned, the UE does not need to initiate an update message when moving among registered area assigned by the same network. Embodiments of the present invention are illustrated by way of an example where each RAT network assigns an RA or TA to the UE. However, the embodiments of the present invention should not be so limiting.

A first embodiment of the present invention is detailed below. The embodiment relates to a mobile communication method. In the embodiment, the access entity in the area where the UE currently locates deletes the association with an originally associated another access entity or informs the another access entity to set the UE to a detached state so as to prohibit paging the UE in the paging area administered by the other access entity which was originally associated with the access entity in the area where the UE currently locates.

Figure 5:
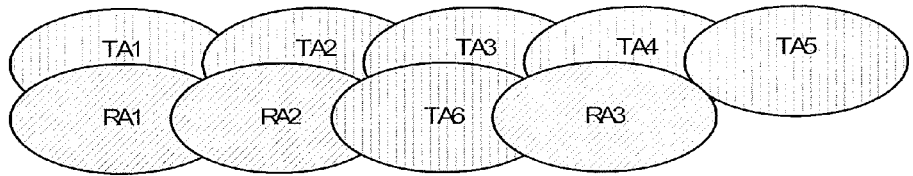
FIG. 5 is a conventional location schematic of TAs and RAs.
Figure 6:
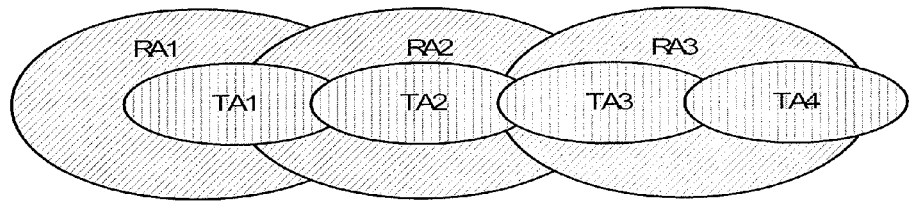
FIG. 6 is another conventional location schematic of TAs and RAs.

The embodiment is illustrated by way of an example where the UE registers with RA2 (as illustrated in FIG. 5) and moves to TA5 and initiates a TAU procedure after the UE moves from TA4 to TA5. A processing procedure of the access entity MME in the area where the UE currently locates is illustrated below.

Figure 7:
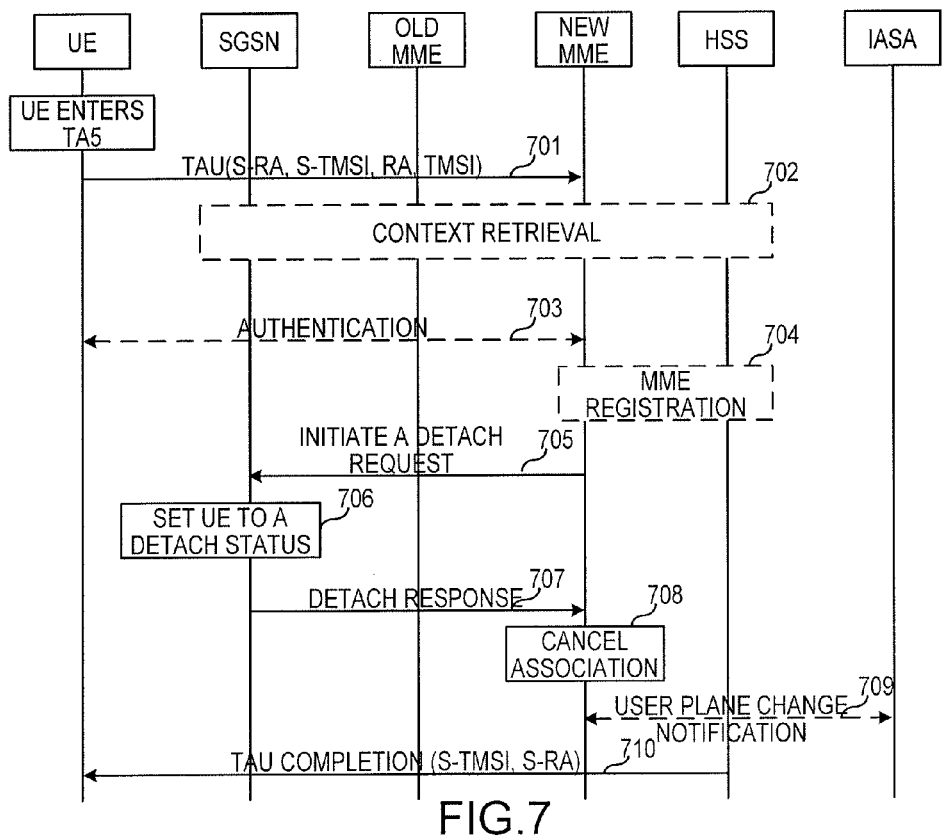
FIG. 7 is a flowchart of a mobile communication method according to a first embodiment of the present invention.

As shown in FIG. 7, in step 701, since the UE enters a new TA, a TAU procedure is initiated. A TAU update message may carry S-RA, S-TMSI, RA, TMSI or parts of these parameters. The parameters described in various embodiments of the present invention are not limited in this respect. The S-TMSI refers to a temporary mobile subscriber identity of the SAE network. The S-RA refers to RA of the SAE, i.e., TA. The TMSI refers to a temporary mobile subscriber identity of the UMTS network. The RA refers to RA of the UMTS.

At step 702, if the access entity of the new TA is an access entity that the UE has not registered with, the new access entity may go through a context retrieval procedure. That is, if the MME of the new TA where the UE moves to is not the same MME with which the UE registered, i.e., the old MME, the new MME needs to retrieve necessary context from the old MME or/and SGSN or/and HSS.

Step 703 is an optional procedure such as a safety authentication.

At step 704, if the MME of the new TA where the UE moves to is not the same MME which the UE registered with, the new MME may initiate a registration procedure with the HSS.

At step 705, the new MME determines if the area where the UE currently locates satisfies a predetermined condition. For instance, the new MME determines if the distance between the area where the UE currently locates and the paging area administered by another access entity originally associated with the area where the UE currently locates is above a predetermined threshold; or if these two areas are not adjacent to each other; or if the access entity in the area where the UE currently locates cannot be associated with another access entity which was originally associated with the area where the UE currently locates; or the time that UE stays in the current area reaches a time threshold; or the speed of the UE in the current area is lower than a threshold. That is, the new MME determines if the distance between TA5 and RA2 (RA2 is retrieved from messages sent by UE or from the context retrieval procedure) exceeds a threshold or TA5 and RA2 are not adjacent to each other or the association between MME and SGSN is limited (e.g., SGSN is not in the "associable SGSN list" of the new MME) or the time that the UE resides in the RAT exceeds a threshold (if the UE stays most of the time in one area, the possibility that the UE is still within the area is high, for instance, the user works at an office or go home and sleep, etc.) With several times of location updates, or being triggered by other access procedures, or being triggered by a time event, embodiments of the present invention can be applied. For instance, paging resource can be saved by de-associating/de-registering the UE from another RAT area and preventing the network from paging in other areas. When the UE further moves to another RAT area, the UE initiates a registration and re-establish the association). The RA2 may be acquired from the message sent from UE or acquired from the context retrieval procedure.

If the distance between TA5 and RA2 exceeds a certain threshold, or they are not adjacent to each other, or the association between a new MME and the SGSN is limited, or the time that the UE resides in an RAT exceeds a threshold, the new MME may initiate a message such as a detach request or association cancellation request and inform the SGSN to set the UE to a detach state or de-register the UE, or mark the UE so as to indicate that the SGSN does not need to page this UE.

At step 706, after SGSN receives the message, the SGSN sets the UE to the detached state or de-registers the UE, or marks the UE to indicate that the SGSN does not need to page this UE.

At step 707, the SGSN returns a response to the new MME.

At step 708, the new MME cancels association with the originally associated SGSN, i.e., deletes the address information of the SGSN.

Then, the procedure might proceed to step 709. The UE's current access entity sends a notification of a change of a user plane to S-GW (IASA). The S-GW prohibits sending data or a paging request to access entities in another network. Step 709 and step 710 are not limited in sequence.

At step 710, the new MME sends a TAU Accept (TAU completion) message. The message only contains a SAE ID or corresponding instructions for the UE. When the UE enters a new RA again, the UE initiates an access procedure using the SAE ID. The reason for doing this is that the new accessed SGSN is not able to retrieve related context from the old SGSN.

It is appreciated that, in this embodiment, when the new access entity MME determines that it is impossible that the MME is associated with its originally associated access entity SGSN in another RAT network, or TA5 where the UE currently locates is not adjacent to paging area RA2 administered by another access entity SGSN or the distance between TA5 and RA2 exceeds a certain threshold, the MME may send a detach request or an association cancellation request, informing another access entity SGSN to set the UE state recorded thereon to a detach state or to de-register the UE, or cancel association between the two access entity. As a result, the paging won't be performed in the paging area administered by the SGSN and the situation that the UE is paged in an area where it is unlikely to appear can be avoided, so that the efficiency for paging the UE is improved.

It should be noted that the case where the access entity in the area where the UE currently locates is SGSN and another RAT entity is MME is similar to the present embodiment, which is omitted herein for brevity.

A second embodiment of the present invention relates to a mobile communication method. The embodiment is likewise illustrated by way of an example where a UE registers with RA2 (as illustrated in FIG. 5) and moves to TA5 and initiates a TAU procedure after the UE moves from TA4 to TA5. A processing procedure of the access entity MME in the area where the UE currently locates is illustrated below. The difference between the present embodiment and the first embodiment is that, in the first embodiment, the access entity in the area where the UE currently locates deletes the association with the originally associated another access entity or informs the another access entity to set the UE to a detached state so as to prohibit paging the UE in the paging area administered by the other access entity which was originally associated with the access entity in the area where the UE currently locates. However, in the present embodiment, the access entity in the area where the UE currently locates modifies association in order to prohibit paging the UE in the paging area administered by the other access entity which was originally associated with the access entity in the area where the UE currently locates.

Figure 8:
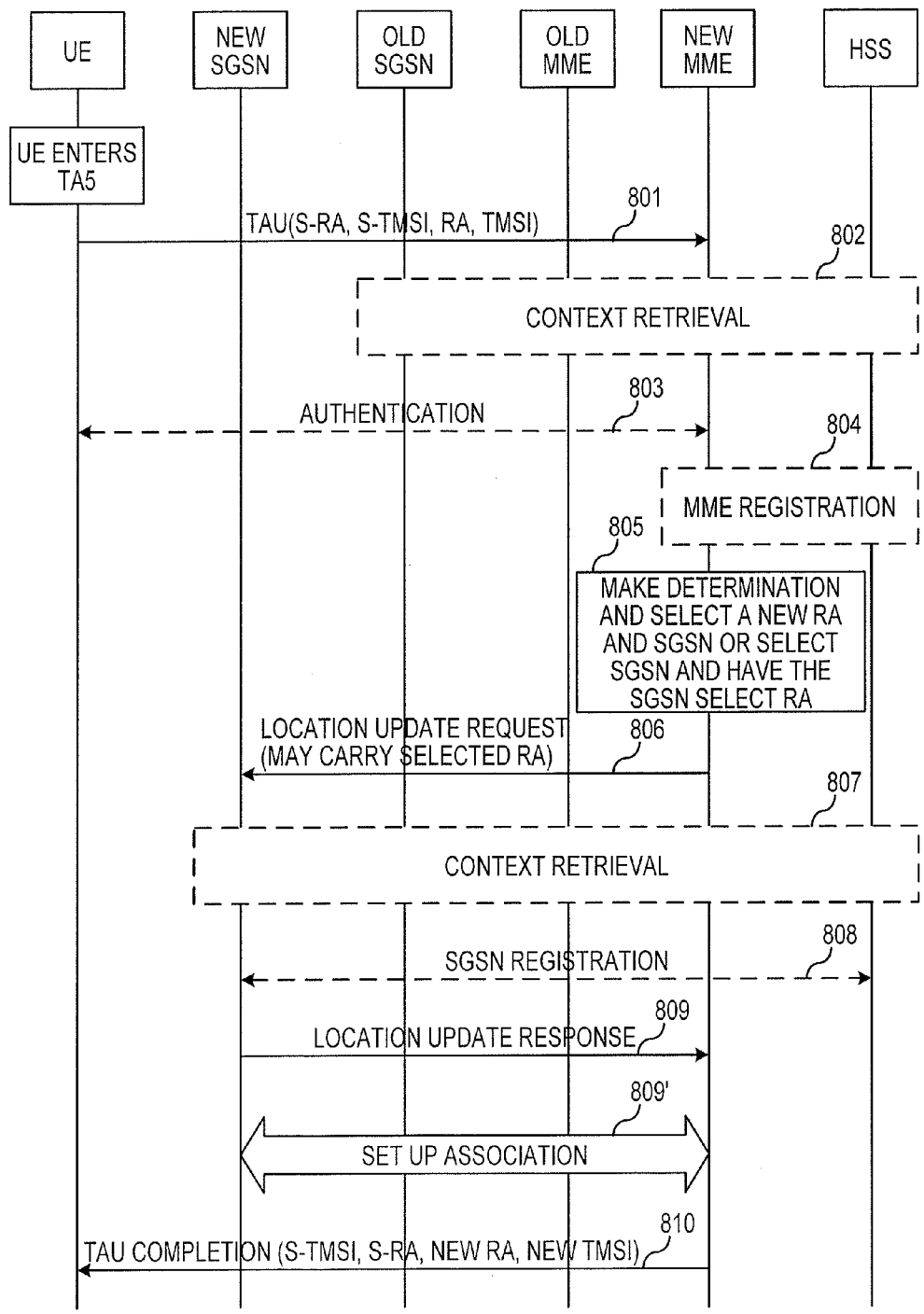
FIG. 8 is a flowchart of a mobile communication method according to a second embodiment of the present invention.

Specifically, as shown in FIG. 8, step 801 to step 804 are identical to step 701 to step 704, the description of which is omitted herein for brevity.

At step 805, the new MME determines if the area where the UE currently locates satisfies a predetermined condition. For instance, the new MME determines if the distance between the area where the UE currently locates and the paging area administered by another access entity originally associated with the area where the UE currently locates is above a predetermined threshold; or if these two areas are not adjacent to each other; or the time that UE stays in the current area reaches a time threshold or the speed of the UE in the current area is lower than a threshold; or if the access entity in the area where the UE currently locates is not able to be associated with another access entity which was originally associated with the area where the UE currently locates. That is, the new MME determines if the distance between TA5 and RA2 (the RA2 is acquired from the messages sent by the UE or from the context retrieval procedure) exceeds a certain threshold or if TA5 and RA2 are not adjacent to each other or the association between MME and SGSN is limited (e.g., the SGSN is not in the "associable SGSN list" of the new MME). The RA2 may be acquired from the message sent from the UE or acquired from the context retrieval procedure.

If the distance between TA5 and RA2 exceeds a certain threshold or TA5 is not adjacent to RA2 or the association between the new MME and SGSN is limited or the time that the UE stays at an RAT exceeds a certain threshold, the new MME may select an access entity administered by an RA which is adjacent to TA5 as another new access entity associated with the current access entity MME. Since there is a plurality of RAs which are adjacent to TA5, the new MME may select, according to a selection algorithm, an adjacent area where UE has a high probability to move into, i.e., the RA where the UE has a high probability to move into, or may select an RA adjacent to TA5 randomly. Alternatively, the newly associated access entity SGSN may select, according to a selection algorithm, an RA where the UE has a high probability to move into or may select an RA adjacent to TA5 randomly as a paging area administered by the newly associated SGSN for the UE.

At step 806, the new MME sends a location update request (or Update Location request) to the SGSN, carries the RA adjacent to TA5 selected by the MME, e.g., RA3. Alternatively, the new MME may send TA5 information and have the SGSN select an appropriate RA.

If the newly associated SGSN selected by the new MME is not the original SGSN with which the UE registered, a context retrieval procedure may be performed such that the new SGSN may obtain necessary context of the UE, as illustrated in step 807.

If the newly associated SGSN selected by the new MME is not the original SGSN with which the UE registered, the newly associated SGSN may also need to initiate a registration with a Home Subscriber Server (HSS), as illustrated in step 808.

At step 809, if the newly associated SGSN accepts the location update, the newly associated SGSN returns a response to the new MME. The association between the MME and SGSN is established (i.e., the new MME acquires address information of the newly associated SGSN, the newly associated SGSN acquires address information of the new MME) as illustrated in step 809'.

At step 810, the MME sends a TAU Accept message. The message contains RA/TMSI ID of the new UMTS (i.e., RA3). Then, the UE does not need to initiate an update message when moving between TA5 and RA3. When UE needs to be paged, paging will be initiated in TA5 and RA3.

It is appreciated that, in the present embodiment, when the new access entity MME determines that the current MME is unlikely to be associated with the originally associated access entity SGSN in another RAT network, or the TA5 where the UE currently locates is not adjacent to the paging area RA2 administered by another access entity SGSN or the distance in-between exceeds a certain threshold, the MME may actively let the UE register with the access entity SGSN in another RAT network adjacent to the new access entity and the SGSN is treated as the newly associated access entity. The newly associated SGSN assigns new TMSI for UE such that the UE does not need to initiate an update message when moving within TA5 and RA3. When the UE needs to be paged, the UE is paged in the paging area (i.e., TA5 and RA3) administered by the newly associated SGSN. Consequently, the network side may conduct paging within the area where the UE is likely to be within. As such, the efficiency for paging UE is further improved.

A third embodiment of the present invention relates to a mobile communication method. The embodiment is likewise illustrated by way of an example where UE registers with RA2 (as illustrated in FIG. 5) and moves to till TA5 and initiates a TAU procedure after UE moves from TA4 to TA5. A processing procedure of the access entity MME in the area where the UE currently locates is illustrated below. The difference between the present embodiment and the first embodiment is that, in the first embodiment, the access entity in the area where the UE currently locates deletes the association with another access entity or informs the another access entity to set UE to an detach state so as to prohibit paging the UE in the paging area administered by another access entity which was originally associated with the access entity in the area where the UE currently locates. However, in the present embodiment, the UE is prohibited to be paged in the paging area administered by the originally associated another access entity by setting the association between the access entity in the area where the UE currently locates and the originally associated another access entity as invalid. When the UE needs to be paged, the UE is paged only in the paging area administered by the access entity in the area where the UE currently locates. The difference between setting the association as invalid and cancelling the association is that, in the case of setting the association as invalid, the access entity in the area where the UE currently locates still records address information of the associated another access entity. Thus, the paging won't be occurred in the network of another access entity while the UE may still in an attach state in another access entity. Of course, MME may also inform the S-GW to stop transmitting data to another access entity.

Figure 9:
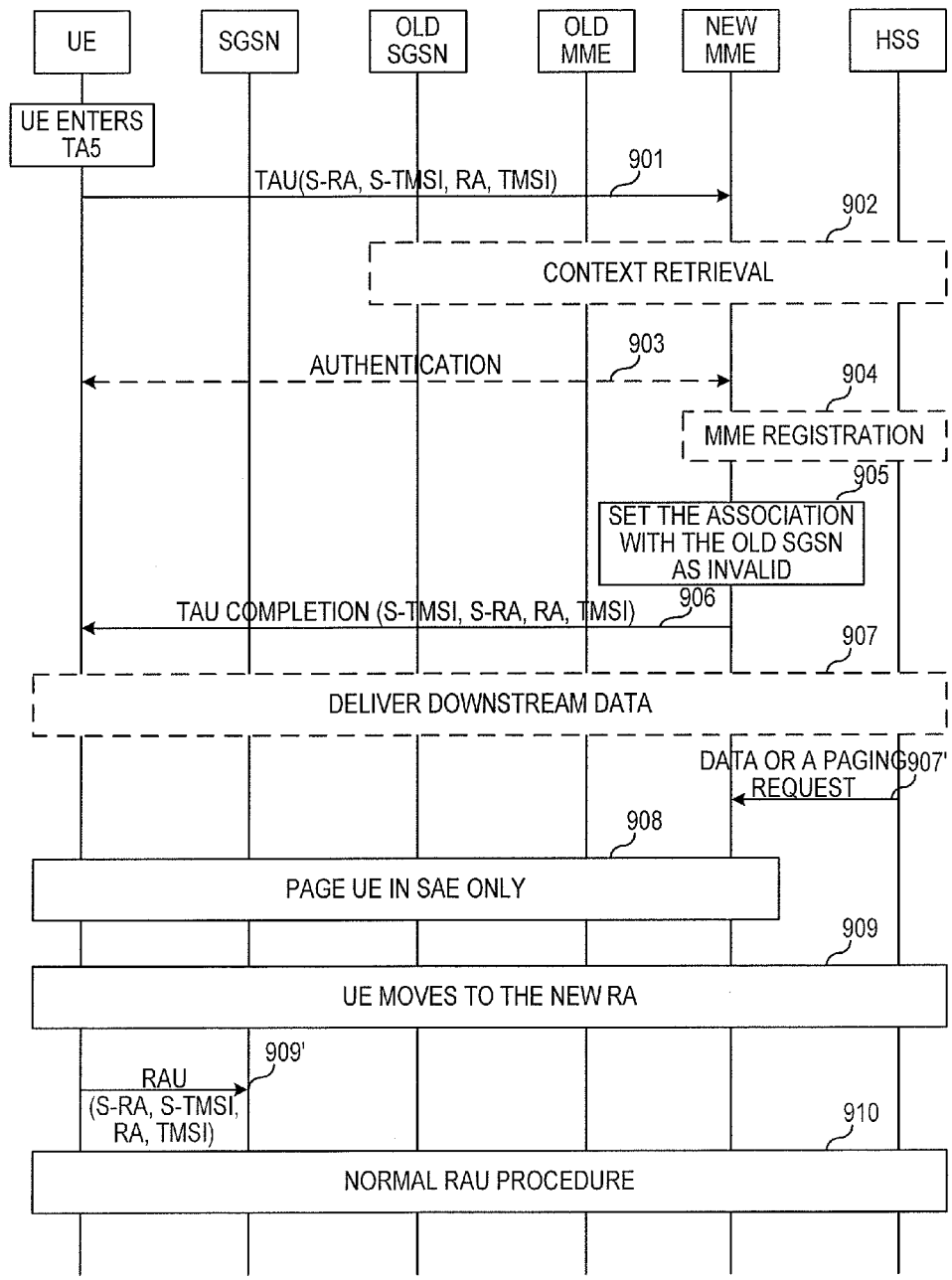
FIG. 9 is a flowchart of a mobile communication method according to a third embodiment of the present invention.

Specifically, as shown in FIG. 9, step 901 to step 904 are identical to step 701 to step 704, the description of which is omitted herein for brevity.

At step 905, the new MME determines if the area where the UE currently locates satisfies a predetermined condition. For instance, the new MME determines if the distance between the area where the UE currently locates and the paging area administered by another access entity originally associated with the area where the UE currently locates exceeds a predetermined threshold; or if these two areas are not adjacent to each other; or the time that UE stays in the current area reaches a time threshold or the speed of the UE in the current area is lower than a threshold; or if the access entity in the area where the UE currently locates is unlikely to be associated with another access entity which was originally associated with the area where the UE currently locates. That is, the new MME determines if the distance between TA5 and RA2 (the RA2 is acquired from the messages sent by the UE or from the context retrieval procedure) exceeds a certain threshold or if TA5 and RA2 is not adjacent or the association between MME and SGSN is limited (e.g., the SGSN is not in the "associable SGSN list" of the new MME). The RA2 may be acquired from the message sent from UE or acquired from the context retrieval procedure.

If the distance between TA5 and RA2 exceeds a certain threshold or TA5 is not adjacent to RA2 or the association between the new MME and SGSN is limited or the time that the UE stays at an RAT exceeds a certain threshold, the new MME marks the association between the new MME and the originally associated SGSN as invalid. Downstream data may always be the first to arrive at MME. When the UE triggers the predetermined condition at the SGSN access entity, the SGSN needs to inform the MME of this information. The UE is still attached to the MME. However, paging will not be performed in the evolved network after the downstream data arrives at the MME, instead, the downstream data will be sent to the SGSN directly and the paging will be performed in the paging area administered by the SGSN.

At step 906, the new MME sends a normal TAU Accept message. Since it is impossible for the UE to move from TA5 to RA2, the UE does not need any modification.

If any downstream data or any paging arrives, since the new MME or UPE has marked the association with SGSN as invalid, the data or paging will not be sent to SGSN, as illustrated in step 907 and step 907'.

At step 908, when the UE needs to be paged, the paging of UE will only be performed in the SAE, rather than in the RA2 corresponding to the UMTS. As such, the situation that the UE is paged in an area where it is impossible for the UE to appear can be avoided, so that the efficiency for paging UE is improved.

When the UE enters a new RA, the UE initiates an RAU, as illustrated in step 909 and step 909'.

At step 910, a normal RAU procedure is performed, such as context retrieval, registration, association. That is, when the UE enters a new RA, the UE initiates an RAU update. If the SGSN is replaced, the UE acquires context from MME or/and old SGSN. The MME sets up a new association with the new SGSN. The method of marking MME as invalid or cancelling association by the new SGSN is similar to marking SGSN as invalid or cancelling association by the new MME according to the embodiments of the present invention, which is omitted herein for brevity. If SGSN has not been replaced, the association between MME and SGSN is recovered. Then, the SGSN may also determine that the association with MME needs to be cancelled, which is similar to the method according to the present embodiment.

Figure 10:
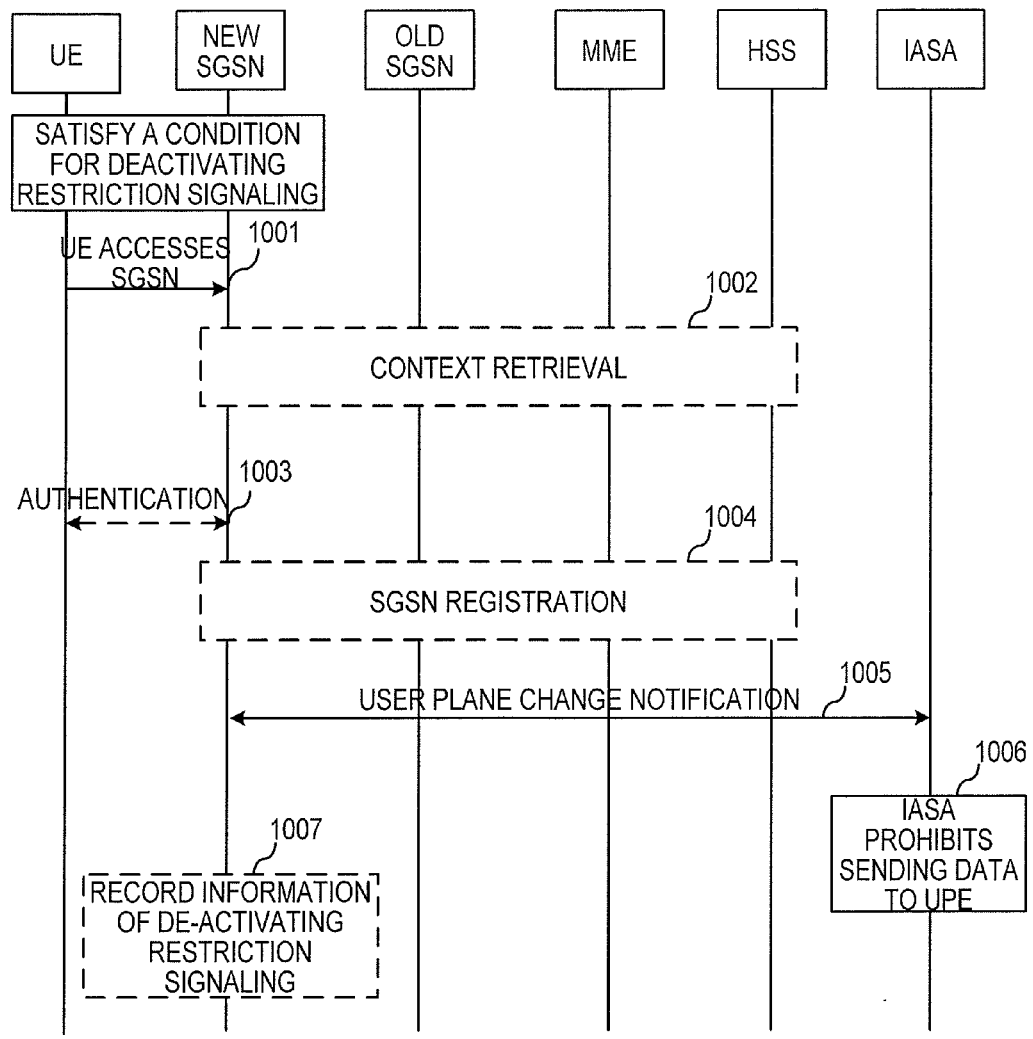
FIG. 10 is a flowchart of a mobile communication method according to a fourth embodiment of the present invention.

A fourth embodiment of the present invention relates to a mobile communication method, as illustrated in FIG. 10. The embodiment is illustrated by way of example where the access entity in the area where the UE currently locates is SGSN and another RAT entity is MME. Of course, the method also applies to the situation where the access entity in the area where the UE currently locates is MME and another RAT entity is SGSN.

When the predetermined condition for deactivating ISR is satisfied, that is, when the distance between the area where the UE currently locates and the paging area administered by the originally associated MME exceeds a predetermined threshold; or when these two areas are not adjacent to each other; or when the access entity in the area where the UE currently locates cannot be associated with another access entity which was originally associated with the area where the UE currently locates; or the time that UE stays in the current area reaches a time threshold or the speed of the UE in the current area is lower than a threshold, the UE accessing the new SGSN may be triggered by UE access event (e.g., location update, or other access) or by time or event of the network (e.g., timer expires), as illustrated in step 1001. The present embodiment is illustrated by way of example where the UE accesses network trigger.

At step 1002, if the content of the access entity is not the most updated, the new access entity may go through a context retrieval procedure.

Step 1003 is an optional procedure such as safety authentication. If the access entity is a new access entity, the new SGSN may further initiate a registration procedure with HSS, as illustrated in step 1004.

At step 1005, the SGSN informs a related user plane entity. The related user plane entity may be an S-GW or P-GW, or other network device. After the related user plane entity receives the notification, it prohibits sending data to another RAT. As such, paging within another RAT is avoided. Specifically, the method of disabling sending data to another RAT includes marking the related user plane entity, or releasing to a channel of another RAT entity (MME in this example), or only establishing in the channel of the access entity (SGSN in this example).

At step 1006, the SGSN records de-activation information and prevents to send data or paging request to another RAT entity after receiving data. The step is optional. At step 1006, IASA disables sending data to UPE.

A fifth embodiment of the present invention relates to a mobile communication method. The present invention is described in a case of dual registration and an ISR de-activation procedure is illustrated by way of example where the UE accesses the SGSN and the SGSN performs an ISR de-activation through an HSS.

Figure 11:
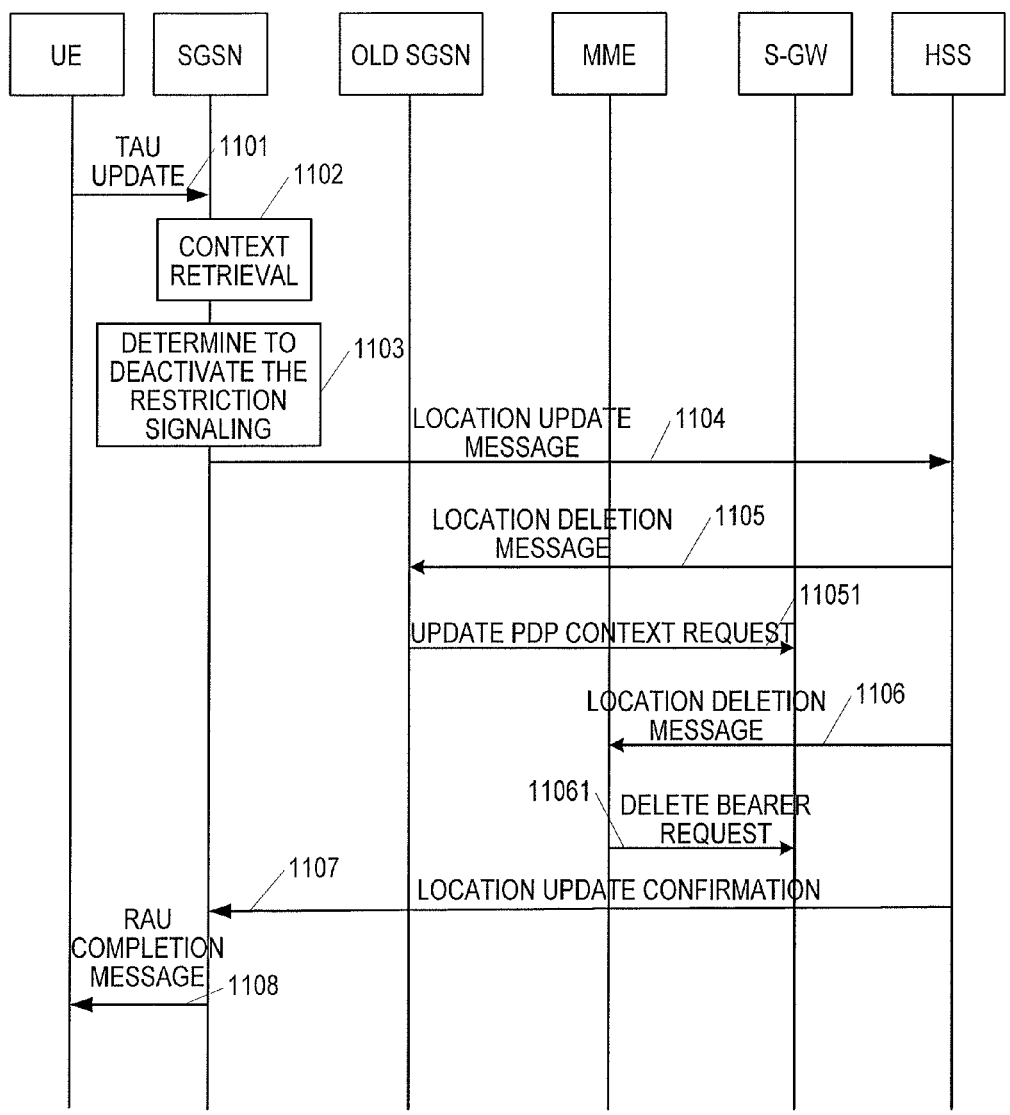
FIG. 11 is a flowchart of a mobile communication method according to a fifth embodiment of the present invention.

FIG. 11 is a flowchart of a mobile communication method according to the fifth embodiment of the present invention;

At step 1101, the UE initiates an RAU request;

At step 1102, the SGSN acquires UE context information.

If the SGSN which the UE currently accesses is a new SGSN, the new SGSN may need to acquire UE context information. The most updated UE context information can be acquired from the old SGSN or MME or HSS. If the SGSN which UE currently accesses does not change and the UE context information stored in the SGSN is the most updated, step 1102 may be skipped and step 1103 is performed directly.

At step 1103, the SGSN which the UE currently accesses determines to initiate an ISR de-activation procedure.

At step 1104, the SGSN which the UE currently accesses sends a location update message (Update Location) to the HSS.

The Update Location message may carry de-activation information, such as values for special reasons, or special value for Update Type, or other indication parameters. Alternatively, when the UE remains the ISR activated, the access entity of UE sends to the HSS an Update Location request carrying ISR activation information (by carrying values for special reasons, or carrying special value for Update Type, or other indication parameters). When the UE deactivates the ISR, the access entity of UE does not carry activation information and the de-activation information is acquired from the HSS. If the S-GW changes, the message may also carry information of the change of the S-GW. For example, the message may carry values for special reasons or other indications. The message may carry entire or partial information of the change of S-GW and/or de-activation ISR information. If the S-GW changes, the de-activation ISR may also just carry information of the change of S-GW, rather than further carrying de-activation restriction information. As such, the S-GW may delete all the bearers. The subsequent procedure is identical, which may not be detailed herein.

If the SGSN which the UE currently accesses has changed, step 1105 is performed. If the SGSN which the UE currently accesses does not change, step 1106 is performed directly.

At step 1105, the HSS sends a location deletion message to the old SGSN.

The location deletion message may carry ISR de-activation information. If S-GW changes, the message can also carry information of the change of S-GW. For example, the message may carry values for special reasons or other indications. After the old SGSN receives the location deletion message, step 11051 is performed.

At step 11051, the old SGSN sends an Update PDP Context Request to the S-GW.

When the Update PDP Context Request carries values for de-activation related reasons or other indication indicative of only deleting bearer information of one access system, the old SGSN requests, in a delete bearer request, the S-GW to only delete related bearers in the SAE network according to the information and also transfers Idle Mode User Plane Termination. If the message carries related reasons or indications for the change of the S-GW, the old SGSN may request, in the delete bearer request, the S-GW to delete all the bearer information of the UE according to the information.

The Idle Mode User Plane Termination refers to the node where the downstream data terminates when the UE is in Idle mode, and triggers the paging of UE. After the UE ISR is activated, since UE registers with SAE and 2G/3G simultaneously, the IMUPT is on S-GW, i.e., after downstream data reaches S-GW, when the S-GW discovers that the UE is in an idle state, the UE is paged within 2G/3G and SAE. After the ISR is activated, when the UE only registers with 2G/3G, if the IMUPT is still in S-GW, S-GW needs to be informed of any change of UE in 2G/3G. This not only increases the processing procedures for network and UE, but also makes no sense. Therefore, the embodiment of the present invention proposes that, when the UE deactivates ISR and the UE only registers with 2G/3G, the IMUPT is transferred to SGSN or wireless network controller.

At step 1106, the HSS sends a location deletion message to MME.

The location deletion message requests MME to delete UE context information, and may further carry the ISR de-activation information. The MME knows about the de-activation information, and step 11061 is performed according to the ISR de-activation information. If S-GW changes, the message can also carry information of the change of S-GW. For example, the message may carry values for special reasons or other indications.

At step 11061, MME sends a Delete Bearer Request to S-GW.

When the Delete Bearer Request may carry values for related reasons of de-activation indicative of only deleting bearer information of one access system, the MME requests, in the Delete Bearer Request, the S-GW to only delete related bearers in the SAE network according to the ISR de-activation information and also transfers IMUPT. If the message carries related reasons or indications for the change of the S-GW, the old SGSN may request, in the Delete Bearer Request, the S-GW to delete all the bearer information of the UE according to the information.

It should be noted that, in practice, step 11051 can be performed and step 11061 can be skipped. In this case, the Delete Bear Request sent at step 1106 does not carry ISR de-activation information. Alternatively, step 11061 can be performed and step 11051 can be skipped. In this case, the Delete Bear Request sent at step 1105 may not carry ISR de-activation information. Alternatively, other method can be employed to delete a bearer or all the bearers in the de-activation system of S-GW. In this case, both steps 11051 and 11061 can be skipped. Step 1105 and step 1106 can be performed without a specific sequence.

At step 1107, the HSS returns a location update confirmation to SGSN which the UE currently accesses.

At step 1108, the UE returns an RAU completion message to SGSN which the UE currently accesses.

So far, the procedure of UE accessing SGSN and de-activating ISR in a dual registration case is performed. In the dual registration case, the procedure of UE accessing MME and de-activating ISR is similar to the above procedure. The MME may also directly send an Update Bearer Request to S-GW, requesting the S-GW to delete bearer information of 2G/3G system. When the S-GW changes, the MME sends a bearer create request (or Create Bearer Request) to the new S-GW. When the UE accesses MME, the transfer of IMUPT is not involved. In the above procedure, if the S-GW that the UE accesses has changed, the embodiment further involves deletion of all the related bearers of the UE on the old S-GW.

Further, it should be noted that even if the UE does not activate the ISR, the method also applies. For example, when the UE performs a Detach operation with ISR, the HSS records two RAT entities with which the UE registers. Assume that the two RAT entities are not purged from the HSS (e.g., the entire UE context is deleted and the information of the entities with which the UE registers is deleted from the HSS). When the UE attaches to an RAT (e.g., SAE) again and if the entity is not changed, the HSS may only delete the old entity of the RAT (i.e., old MME). When the UE again enters another RAT (e.g., 2G/3G) and the ISR has not been activated (e.g., the SGSN accessed does not support the ISR or for other reasons), the UE initiates an Update Location with the HSS which may carry values for special reasons. Such information is delivered to the HSS (or when the ISR activated, information of a certain parameter may be carried and when the ISR is not activated, the information will not be carried. The de-activation information is acquired from the HSS). If the SGSN which the UE accesses changes, the HSS may initiate a Cancel Location to two entities. One is the entity to be attached by the UE and the other is the old entity detached by the UE previously.

A sixth embodiment of the present invention relates to a mobile communication method. According to the present invention, in a case of single registration, the SGSN registers with HSS and the MME registers with SGSN, and an ISR de-activation procedure is illustrated by way of example where the UE accesses SGSN.

Figure 12:
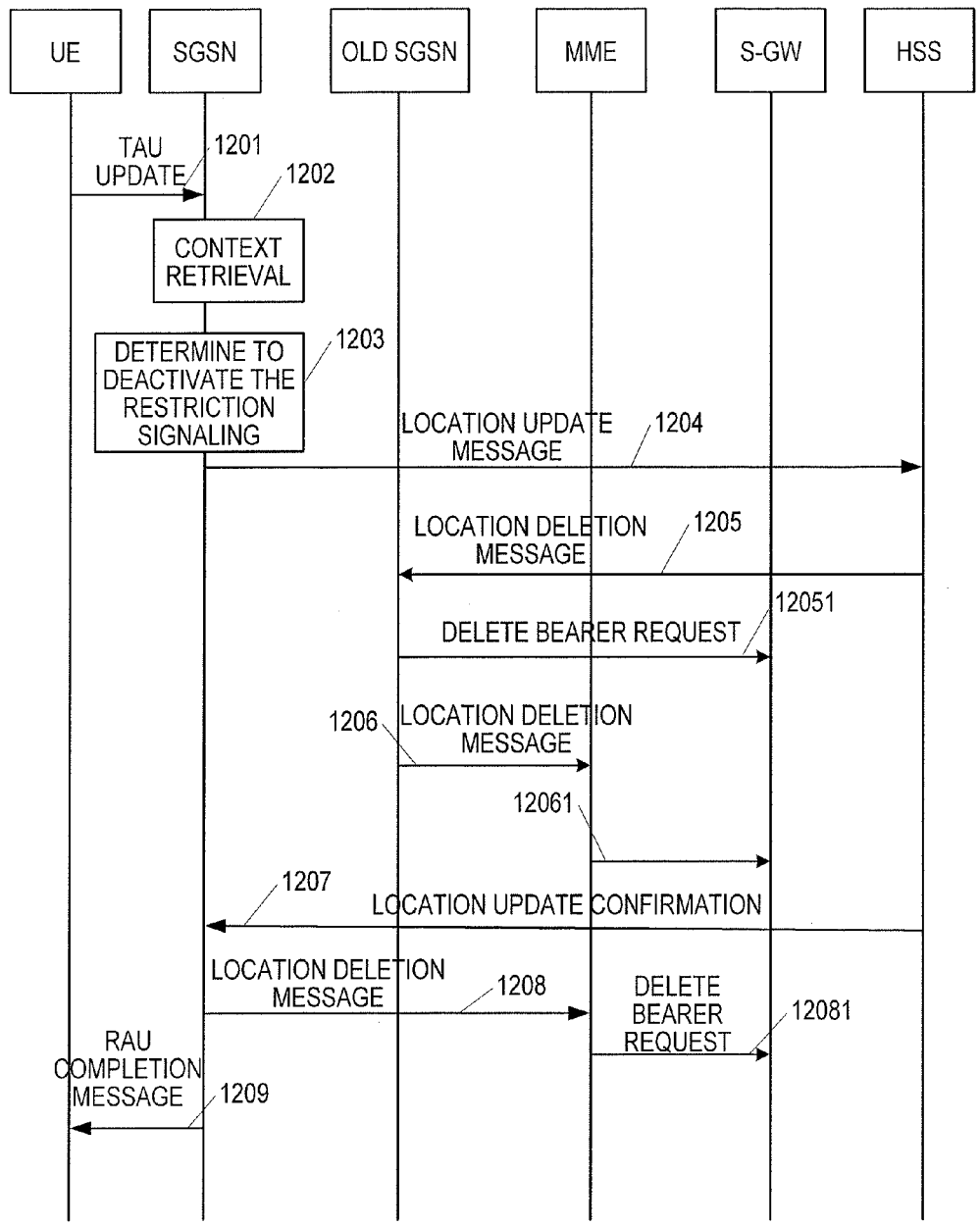
FIG. 12 is a flowchart of a mobile communication method according to a sixth embodiment of the present invention.

FIG. 12 is a flowchart of a mobile communication method according to the sixth embodiment of the present invention.

At step 1201, UE initiates an RAU request.

At step 1202, SGSN acquires UE context information.

If the SGSN which UE currently accesses is a new SGSN, the new SGSN may need to acquire UE context information. The most updated UE context information can be acquired from the old SGSN or MME or HSS. If the SGSN which UE currently accesses dose not change and the UE context information stored in the SGSN is the most updated, step 1202 is skipped and step 1203 is performed directly.

At step 1203, SGSN which the UE currently accesses determines to initiate an ISR de-activation.

If the SGSN which the UE currently accesses has changed, since the new SGSN has not registers with HSS, step 1204 is performed. If the SGSN which the UE currently accesses does not change, step 1208 is performed directly.

At step 1204, the SGSN which the UE currently accesses sends an Update Location message to HSS.

The Update Location message may carry de-activation information, such as values for special reasons, or special value for Update Type. Alternatively, when the UE remain ISR activated, the access entity of UE sends to the HSS an Update Location request carrying information indicative of activating the ISR (by carrying values for special reasons, or carrying special value for Update Type). When the UE deactivates the ISR, the access entity of UE does not carry activation information and the de-activation information is acquired from the HSS. If the S-GW changes, the message can also carry information of the change of S-GW. For example, the message may carry values for special reasons or other indications.

At step 1205, the HSS sends a location deletion message to the old SGSN.

The location deletion message may carry the ISR de-activation information. The message may also carry the information of the change of S-GW. After the old SGSN receives the location deletion message, step 12051 is performed.

At step 12051, the old SGSN sends a Delete Bearer Request to S-GW.

If the ISR de-activation information carries values for related reasons indicative of only deleting bearer information of one access system, the old SGSN requests, in a Delete Bearer Request, the S-GW to only delete related bearer in the SAE network according to the ISR de-activation information and also transfers IMUPT. If the message carries related reasons or indications for the change of the S-GW, the old SGSN may request, in the Delete Bearer Request, the S-GW to delete all the bearer information of the UE according to the information.

At step 1206, the old SGSN sends a location deletion message to the MME.

The location deletion message may carry ISR de-activation information. The message may also carry the information of the change of S-GW. Since the MME is registered with the old SGSN, the old SGSN may send the location deletion message to the MME. The location deletion message requests MME to delete UE context information, and may further carry the ISR de-activation information and/or the information of the change of S-GW. The MME may perform step 12061 according to the ISR de-activation information.

At step 12061, the MME sends a Delete Bearer Request to S-GW.

If the ISR de-activation information carries values for related reasons indicative of only deleting bearer information of one access system, the MME requests, in a Delete Bearer Request message, the S-GW to only delete related bearer in the SAE network according to the ISR de-activation information and also transfers IMUPT. If the message carries related reasons or indications for the change of the S-GW, the MME may request, in the Delete Bearer Request, the S-GW to delete all the bearer information of the UE according to the information.

It should be noted that, in practice, step 12051 can be performed and step 12061 can be skipped. In this case, the Delete Bear Request sent at step 1206 does not carry ISR de-activation information. Alternatively, step 12061 can be performed and step 12051 can be skipped. Alternatively, other method can be employed to delete a bearer or all the bearers in the de-activation system of S-GW. In this case, both steps 12051 and 12061 can be skipped. Step 1205 and step 1206 can be performed without a specific sequence. If the bearer is deleted according to other method or according to step 12051 or 12061, then the de-activation information and/or the information of the change of S-GW is not needed in step 1204, or 1205, or 12051, or 1206, or 12061.

At step 1207, the HSS returns a location update confirmation to the SGSN which the UE currently accesses.

After the SGSN which the UE currently accesses receives the location update confirmation, step 1209 is performed.

At step 1208, the SGSN sends a location deletion message to MME.

Since the MME registers with SGSN, the SGSN may directly send the location deletion message to the MME. The message may carry ISR de-activation information. The MME deletes UE context information according to the ISR de-activation information and may further perform step 12081. If the S-GW changes, the message can also carry information of the change of S-GW. For example, the message may carry values for special reasons or other indications. If the bearer is deleted according to other method, it is not necessary for the message to carry the de-activation information and/or the information of the change of S-GW, and step 12081 may not be performed.

At step 12081, the MME sends a Delete Bearer Request to S-GW.

If the ISR de-activation information carries values for related reasons indicative of only deleting bearer information of one access system, the MME requests, in a Delete Bearer Request, the S-GW to only delete related bearer in the SAE network according to the ISR de-activation information and also transfers IMUPT. If the message carries related reasons or indications for the change of the S-GW, the old SGSN may request, in the Delete Bearer Request, the S-GW to delete all the bearer information of the UE according to the information.

After the MME deletes UE context information, the MME returns a confirmation message to SGSN. After the SGSN receives the confirmation message returned from MME, step 1209 is performed.

At step 1209, the UE returns an RAU completion message to SGSN which the UE currently accesses.

So far, a procedure of UE accessing the SGSN and de-activating ISR is performed in a single registration case where the SGSN registers with HSS and MME registers with SGSN. In the single registration case, the procedure of UE accessing MME and de-activating ISR is similar to the above procedure. The MME may also directly send an Update Bearer Request to the S-GW, requesting the S-GW to delete bearer information of 2G/3G system. When the S-GW changes, the MME sends a Create Bearer Request to the new S-GW. Also, the MME needs to registers with HSS and deletes registration information of SGSN in the HSS. At the same time, when the UE accesses MME, 2G/3G system is deactivated and the transfer of IMUPT is not involved. In the above procedure, if the S-GW that the UE accesses has changed, the embodiment further involves deletion of all the related bearers of the UE on the old S-GW.

Figure 13:
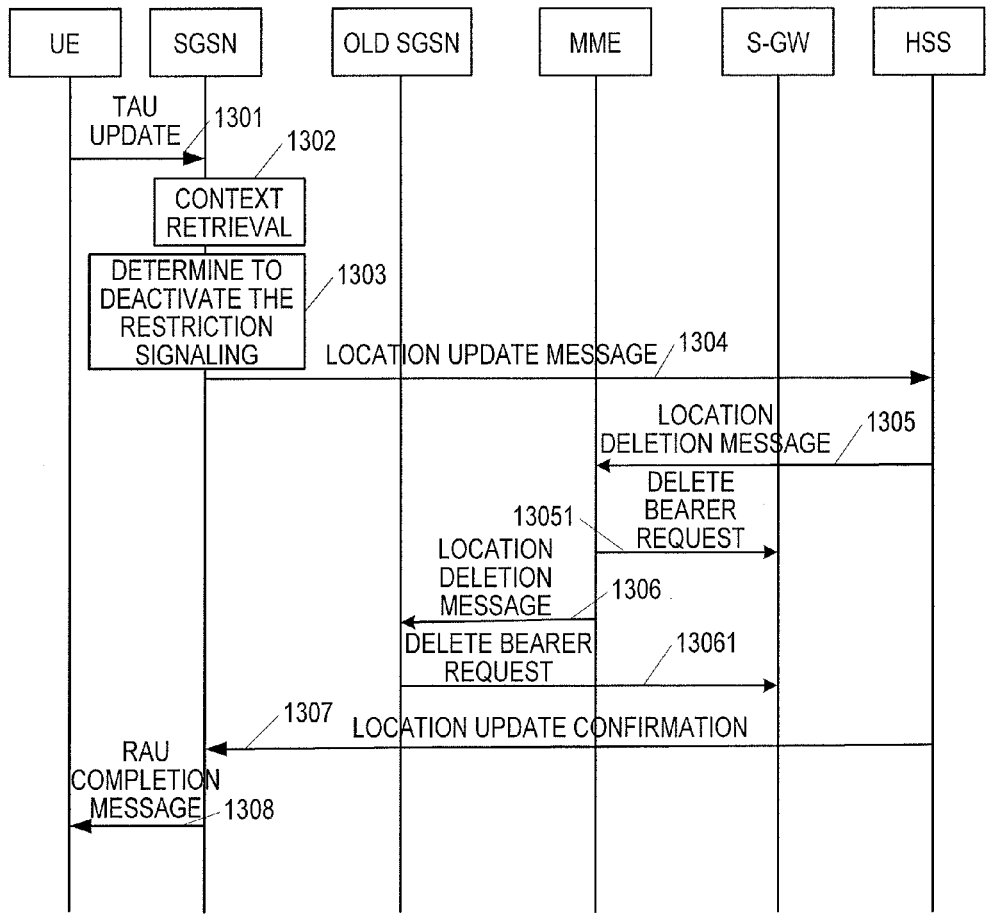
FIG. 13 is a flowchart of a mobile communication method according to a seventh embodiment of the present invention.

As shown in FIG. 13, a seventh embodiment of the present invention relates to a mobile communication method. According to present invention, in a single registration case, the MME registers with HSS and the SGSN registers with MME, and an ISR de-activation procedure is illustrated by way of example where the UE accesses SGSN.

At step 1301, the UE initiates an RAU request.

At step 1302, the SGSN acquires UE context information.

If the SGSN which UE currently accesses is a new SGSN, the new SGSN may need to acquire UE context information. The most updated UE context information can be acquired from the old SGSN or MME or HSS. If the SGSN which UE currently accesses does not change and the UE context information stored in the SGSN is the most updated, step 1302 may be skipped and step 1303 is performed directly.

At step 1303, SGSN which the UE currently accesses determines to initiate an ISR de-activation.

At step 1304, the SGSN sends an Update Location message to HSS.

The Update Location message may carry de-activation information, such as values for special reasons, or special value for Update Type. Alternatively, when the UE remains the ISR activated, the access entity of UE sends to the HSS an Update Location request carrying ISR de-activation information (by carrying values for special reasons, or carrying special value for Update Type). When the UE deactivates the ISR, the access entity of UE does not carry activation information and the de-activation information is acquired from the HSS. If the S-GW changes, the message can also carry information of the change of S-GW. For example, the message may carry values for special reasons or other indications.

If the SGSN which the UE currently accesses has changed, after HSS receives the location update message, step 1306 is performed after step 1305 is performed. If the SGSN which the UE currently accesses does not change, step 1306 can be skipped.

At step 1305, the HSS sends a location deletion message to MME.

The location deletion message requests the MME to delete ME context information and the message may carry ISR de-activation information and/or the information of the change of S-GW. After the MME receives the location deletion message, the MME performs step 13051 according to the restriction signal de-activation information.

At step 13051, the MME sends a Delete Bearer Request to S-GW.

If the ISR de-activation information carries values for related reasons indicative of only deleting bearer information of one access system, the MME requests, in a Delete Bearer Request, the S-GW to only delete related bearer in the SAE network according to the ISR de-activation information and also transfers IMUPT. If the message carries information of the change of the S-GW, the MME may request, in the Delete Bearer Request, the S-GW to delete all bearer information of the UE according to the information.

At step 1306, the MME sends a location deletion message to the old SGSN.

After the MME receives the location deletion message sent by the HSS, the MME sends the location deletion message to the old SGSN according to the ISR de-activation information. After the old SGSN receives the location deletion message, step 13061 is performed. The message may carry ISR de-activation information and/or the information of the change of S-GW.

At step 13061, the old SGSN sends a Delete Bearer Request to S-GW.

If the ISR de-activation information carries values for related reasons indicative of only deleting bearer information of one access system, the old SGSN requests, in a Delete Bearer Request, the S-GW to only delete related bearer in the SAE network according to the ISR de-activation information and also transfers IMUPT. If the message carries information of the change of the S-GW, the old SGSN may request, in the Delete Bearer Request, the S-GW to delete all bearer information of the UE according to the information.

It should be noted that, in practice, step 13051 can be performed and step 13061 can be skipped. In this case, the Delete Bear Request sent at step 1306 does not carry ISR de-activation information. Alternatively, step 13061 can be performed and step 13051 can be skipped. Alternatively, other method can be employed to delete a bearer. In this case, both steps 13051 and 13061 can be skipped and the location bearer request may not carry ISR de-activation information and/or information of the change of S-GW at step 1305 and/or 1306.

At step 1307, the HSS returns a location update confirmation to the SGSN which the UE currently accesses.

At step 1308, the UE returns an RAU completion message to SGSN which the UE currently accesses.

So far, a procedure of UE accessing the SGSN and de-activating ISR is performed in a single registration case where the MME registers with HSS and SGSN registers with HSS. In the single registration case, the procedure of UE accessing MME and de-activating ISR is similar to the above procedure. The new MME may also directly send an Update Bearer Request to S-GW, requesting the S-GW to delete bearer information of 2G/3G system. When the S-GW changes, the MME sends a Create Bearer Request to the new S-GW. Also, the MME needs to delete the registration information of SGSN. At the same time, when the UE accesses MME, the transfer of IMUPT is not involved. In the above procedure, if the S-GW that the UE accesses has changed, the embodiment further involves deletion of all the related bearers of the UE on the old S-GW.

It should be noted that when the SGSN which the UE currently accesses is SGSN (e.g., SGSN of R6) of Pre-R8 (e.g., SGSN of R7), the SGSN does not support ISR. The SGSN which the UE currently accesses needs to establish a bearer connection with P-GW, and deletes all the related bearer information of UE on the S-GW. When the access entity (MME/SGSN) which the UE currently accesses does not support ISR, the MME/SGSN needs to establish a bearer connection with P-GW and deletes all the related bearer information of UE on the S-GW. In general, when the access entity which the UE currently accesses does not support ISR, the method described in the above embodiment also applies.

In step 1103, step 1203, and step 1303 of the foregoing embodiments, the SGSN which the UE currently accesses determines to initiate the de-activation of the ISR. The cause for triggering to initiate the ISR de-activation may be that the distance between the area where the UE currently locates and the paging area administered by the originally associated access entity in another network exceeds the threshold, or these two areas are not adjacent with each other; or the access entity in the area where the UE currently locates can not be associated with the originally associated access entity in the other network (e.g., the entity which the UE accesses does not support ISR or does not allow to use ISR) or association is not required according to the configurations; or the time that the UE stays in the current access system exceeds a threshold; or the speed of the UE in the current area is lower than a threshold, etc.

In the embodiments of the above mobile communication method, although the network environment and the mobility states of the UE are different, e.g., for the new SGSN which the UE accesses or the new accessed MME, the ISR de-activation procedure may be different, the ISR de-activation under various network environment or UE mobility states follows the below principle. When the UE accesses an access entity of a network, the access entity in another network may delete, invalidate or update the context associated with the UE and may delete the bearer of the access entity of other network and the S-GW or delete the registration information of the access entity in the HSS. If the network which the UE accesses is 2G/3G network, the process may further involve a transfer of IMUPT. Also, as the S-GW which the UE accesses changes, the bearers of the access entity in the network and the old S-GW need to be deleted and all the bearer information related to the UE on the SGSN needs to be deleted and the bearers to the new S-GW needs to be established. For instance, the UE accesses SGSN and the SGSN sends a request for establishing PDP context to the new S-GW. The request carries related de-activation information and the bearer information established by the S-GW to the SGSN.

Figure 14:
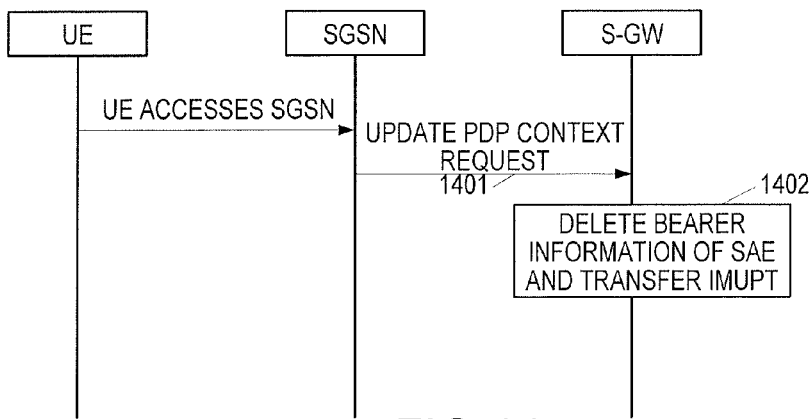
FIG. 14 is a flowchart of a mobile communication method according to an eighth embodiment of the present invention.

An eighth embodiment of the present invention relates to a mobile communication method, which applies to the single registration case and the double registration case. When the UE accesses the originally registered SGSN, the SGSN decides to deactivate the ISR. Referring to FIG. 14, following steps are included.

At step 1401, when the SGSN which the UE currently accesses initiates an Update Bearer Request (also referred to as Update PDP Context Request) to the S-GW, where the request may carry ISR de-activation information.

At step 1402, after S-GW receives the de-activation information, the S-GW decides to delete bearer information of SAE and may transfer IMUPT.

After the deletion is completed, the S-GW returns a successful deletion response to the SGSN.

Other portion of the present embodiment is similar to the description mentioned in the above embodiments in which the MME deletes UE context and completes de-activation of the ISR.

Likewise, the procedure after the UE accesses MME is also similar. The MME initiates an Update Bearer procedure with the S-GW after the MME decides to perform de-activation. The S-GW may delete bearer information of 2G/3G, but may not transfer IMUPT.

As can be seen from various embodiments, in the process of the access entity performing a location update for the UE or performing a UE access procedure, the embodiments may include determining whether or not the area which the UE currently locates satisfies a predetermined condition. If the predetermined condition is satisfied and when the UE needs to be paged, the UE is paged in the paging area administered by the access entity and it is prohibited to page the UE in the paging area administered by the originally associated access entity in the other network. As such, the situation that the UE is paged in an area where it is impossible for the UE to appear can be avoided, so that the efficiency for paging UE is improved.

Specifically, the embodiments of the present invention prohibit paging the UE in the paging area administered by the originally associated access entity in another network by deleting the association with the originally associated access entity in another network; or by setting the UE to a detach state via the originally associated access entity in another network; or altering the original association; or by setting the association between the access entity and the originally associated access entity in another network as invalid and paging the UE only in the paging area administered by the current access entity. Various approaches are provided for the embodiment of the embodiments of the present invention.

The access entity may modify the original association in the following ways. The UE is registered with the access entity in paging area in another network adjacent to the area where the UE currently locates. The access entity is treated as a new access entity associated with the current access entity in the other network. When the UE needs to be paged, the UE is paged in the paging area administered by the access entity and the paging area in the other network. Consequently, the network side may conduct paging within the area where the UE is likely to be within. As such, the efficiency for paging UE is further improved.

A ninth embodiment of the present invention relates to a mobile communication system. The system includes access entities in at least two networks which accept the registration of a same UE where each access entity is associated with one another. In addition, the system also includes a determination module, configured to determine if the area where the UE currently locates meets a predetermined condition in the process of the access entity performing a location update for the UE or performing UE access; and an enabling modification module, configured to prohibit paging the UE in the paging area administered by the originally associated access entity in the other network when the determination module determines that the predetermined condition is met.

Such a predetermined condition may be that the distance between the area where the UE currently locates and the paging area administered by the originally associated access entity exceeds a predetermined threshold; or these two areas are not adjacent to each other; or the access entity in the area where the UE currently locates can not be associated with the originally associated access entity in another network; or the time that UE stays in an RAT exceeds a time threshold.

The enabling modification module may be used to prohibit paging the UE in the paging area administered by the originally associated access entity in another network by deleting the association between the access entity in the area where the UE currently locates and the originally associated access entity in another network; or by informing the originally associated access entity in another network to set UE to a detach state; or by modifying the original association; or by setting the association between the access entity in the area where the UE currently locates and the originally associated access entity in another network as invalid and paging, when there is a need to page UE, the UE only in the paging area administered by the current access entity in the area where the UE currently locates. The enabling module prohibits paging the UE in the paging area administered by the originally associated access entity in another network so that the situation that the UE is paged in an area where it is impossible for the UE to appear can be avoided, and the efficiency for paging UE is improved.

The mobile communication system may further include a registration module and a paging module. The registration module is configured to register US with the access entity associated with the paging area in the other network adjacent to the area where the UE currently locates when the predetermined condition is met. The access entity is treated as a new access entity in another network associated with the access entity in the area where the UE currently locates. The enabling modification module modifies the original association via the registration module. The paging module is configured to page, when there is a need to page the UE, the UE in the paging area administered by the access entity in the area where the UE currently locates and the paging area administered by the newly associated access entity, i.e., the UE is paged in the adjacent paging area in another network. Consequently, the network side may conduct paging within the area where the UE is likely to be within. As such, the efficiency for paging UE is further improved.

Of course, if the determination module determines that the predetermined condition is not met, then when the UE needs to be paged, the paging module pages the UE in the paging area administered by the access entity in the area where the UE currently locates and the paging area administered by the originally associated access entity in another network.

A tenth embodiment of the present invention relates to an access entity, The access entity includes an association module configured to associate access entities in another network which may accept the registration of a same UE; a determination module, configured to determine if the area where the UE currently locates meets a predetermined condition in the process of location update for the UE or UE access; and an enabling modification module, configured to prohibit paging the UE in the paging area administered by the originally associated access entity in the other network when the determination module determines that the predetermined condition is met.

Such a predetermined condition may be that the distance between the area where the UE currently locates and the paging area administered by the originally associated access entity exceeds a predetermined threshold; or these two areas are not adjacent to each other; or the current access entity can not be associated with the originally associated access entity in another network.

The enabling modification module may be used to prohibit paging the UE in the paging area administered by the originally associated access entity in another network by deleting the association between the current access entity and the originally associated access entity in another network; or by informing the originally associated access entity in another network to set UE to a detach state; or by modifying the original association; or by setting the association between the current access entity and the originally associated access entity in another network as invalid and paging, when there is a need to page UE, the UE only in the paging area administered by the current access entity. The enabling module prohibits paging the UE in the paging area administered by the originally associated access entity in another network so that the situation that the UE is paged in an area where it is impossible for the UE to appear can be avoided, and the efficiency for paging UE is improved.

The access entity may further include a registration module and a paging module. The registration module is configured to register UE with the access entity associated with the paging area in the other network adjacent to the area where the UE currently locates when the predetermined condition is met. The access entity is treated as a new access entity in another network associated with the current access entity. The enabling modification module modifies the original association via the registration module. The paging module is configured to page the UE in the paging area administered by the current access entity when the UE needs to be paged and inform the newly associated access entity to page the UE in the paging area administered by the newly associated access entity. Consequently, the network side may conduct paging within the area where the UE is likely to be within. As such, the efficiency for paging UE is further improved.

The embodiment of the present invention is not limiting as to whether or not to integrate MME/S-GW and integrate S-GW and P-GW regarding embodiments of the present invention. Some of the above embodiments are described in an example where the MME/S-GW/P-GW are integrated. However, such embodiments also apply to the procedure where the MME/S-GW/P-GW are separated.

The foregoing embodiments are described in an example where the UE is within SAE and UE is triggered by the location update. Embodiments where the UE is triggered in other manners or by the network are relatively simple, the description of which are omitted herein for brevity.

Figure 15:
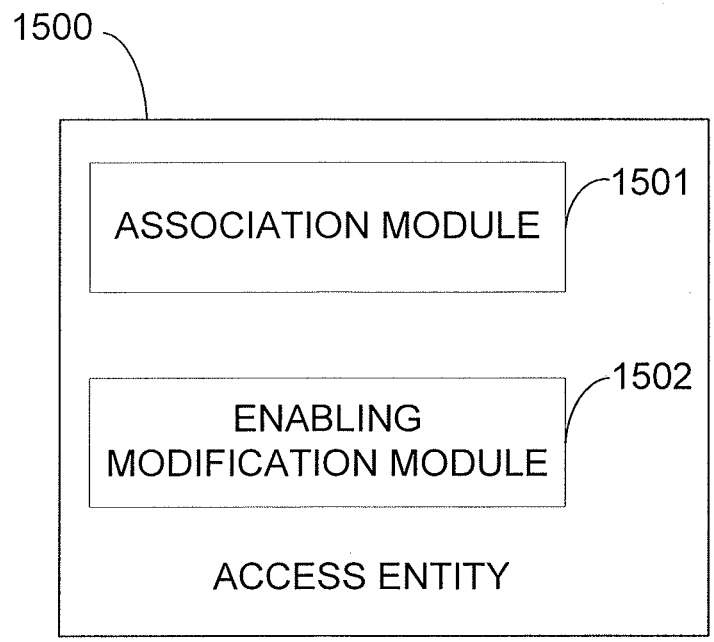
FIG. 15 is a block diagram of an access entity according to one embodiment of the present invention.

Referring to FIG. 15, an access entity 1500 is also provided according to one embodiment of the present invention. The access entity includes an association module 1501 for associating access entities in another network which accept the registration of a same UE. The access entity also includes:

an enabling modification module 1502, configured to prohibit paging UE in a paging area administered by an originally associated access entity in another network when an access entity in one of at least two networks performs a location update for the UE or other access procedure.

The access entity further includes:
a transfer notification module, configured to inform the originally associated access entity in another network to transfer IMUPT; and an enabling modification module, configured to prohibit paging the UE in the paging area administered by the originally associated access entity in another network in such manners as to inform the HSS and let the HSS inform the originally associated access entity in another network to delete the association with an access entity in one of at least two networks or inform the originally associated access entity in another network to delete association with an access entity in one of at least two networks.

Figure 16:
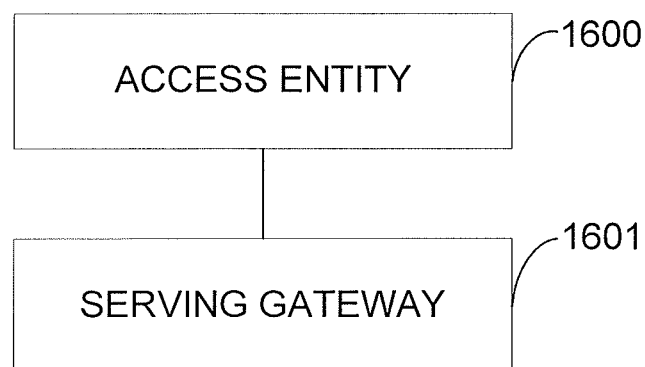
FIG. 16 is a block diagram of a bearer transfer system according to one embodiment of the present invention.

Referring to FIG. 16, a bearer transfer system is further provided according to an embodiment of the present invention. The system includes an access entity 1600 in one of at least two networks and a Serving Gateway 1601; wherein the access entity 1600 in one of at least two networks is configured to send a bearer transfer request to the Serving Gateway 1601.

After receiving the bearer transfer request, the Serving Gateway 1601 deletes bearer information of other network which is originally associated with the access entity in one of the at least two networks.

The bearer transfer system further includes an originally associated access entity in another network and an HSS.

The HSS is configured to send a location deletion message to the originally associated access entity in another network after receiving an Update Location message from the access entity in one of the at least two networks.

The originally associated access entity in another network is configured to send a bearer transfer request to the Serving Gateway after receiving the location deletion message.

The bearer transfer system further includes an old access entity in one of two networks.

The HSS is further configured to send a location deletion message to the old access entity in one of the two networks.

After receiving the location deletion message, the old access entity in one of the networks sends the bearer transfer request to the Serving Gateway.

After receiving the bearer transfer request, the Serving Gateway deletes bearer information of other network which is originally associated with the access entity in one of the at least two networks.

The bearer transfer system further includes an old Serving Gateway;

The access entity in one of the two networks is further configured to send a Create Bearer request to the Serving Gateway and send a location deletion message to the originally associated access entity in another network.

The serving network is further configured to return a Create Bearer response to the access entity in one of the two networks after receiving the Create Bearer request.

The originally associated access entity in another network or the old access entity in one of the two networks is configured to send a bearer transfer request to the old Serving Gateway after receiving the location deletion message.

The old Serving Gateway is configured to delete bearer information of the UE after receiving the bearer transfer request.

Although several preferred embodiments have been presented in conjunction with the drawings, it is appreciated by those skilled in the art that any modification in formalities and details can be made without departing from the spirit and scope of the present invention.

What is claimed is:

1. A method for mobile communication where a user equipment is moving within a coverage of a first network and a second network, wherein the user equipment is registered with both a first access entity of the first network and a second access entity of the second network, and a first association is established between the first access entity and the second access entity so that when the user equipment needs to be paged, the user equipment is paged in a first paging area administered by the first access entity and a second paging area administered by the second access entity according to the first association, and the method comprising:

receiving, by a user plane equipment, a first message from a third access entity of the second network, wherein the first message is used to inform the user plane equipment to implement one step of the group consisting of: (a) prohibiting data or a paging request from being sent to the first access entity, and (b) deleting a bearer of the first access entity;

wherein, the first message is sent by the third access entity if a predetermined condition is satisfied, the predetermined condition comprises one or more of the following:

(i) a distance between an area where the user equipment is currently located and the first paging area administered by the first access entity exceeds a predetermined threshold;

(ii) the third access entity cannot be associated with the first access entity; and (iii) a speed of the user equipment in a current access entity system is lower than a threshold.

2. The method of claim 1, wherein the user plane equipment is one of the group consisting of (a) a serving gateway, and (b) a General Packet Radio Service (GPRS) gateway support node.

3. A user plane equipment, when a user equipment moving within a coverage of a first network and a second network, wherein the user equipment registers with both a first access entity of the first network and a second access entity of the second network, a first association is established between the first access entity and the second access entity; when the user equipment needs to be paged, the user equipment is paged in a first paging area administered by the first access entity and a second paging area administered by the second access entity according to the first association, the user plane equipment comprising:

a receiver, configured to receive a first message from a third access entity of the second network;

a processor, configured to implement one step of the group consisting of: (a) prohibiting data or a paging request from being sent to the first access entity, and (b) deleting a bearer of the first access entity;

wherein, the first message is sent by the third access entity if a predetermined condition is satisfied, the predetermined condition comprises one or more of the following:

(i) a distance between an area where the user equipment is currently located and the first paging area administered by the first access entity exceeds a predetermined threshold;

(ii) the third access entity cannot be associated with the first access entity; and (iii) a speed of the user equipment in a current access entity system is lower than a threshold.

4. The user plane equipment of claim 3, wherein the user plane equipment is one of the group consisting of (a) a serving gateway and (b) a General Packet Radio Service (GPRS) gateway support node.

* * * * *

UNITED STATES PATENT AND TRADEMARK OFFICE
CERTIFICATE OF CORRECTION

| | | |
|---|---|---|
| PATENT NO. | : 8,619,648 B2 | Page 1 of 1 |
| APPLICATION NO. | : 13/717179 | |
| DATED | : December 31, 2013 | |
| INVENTOR(S) | : Guo et al. | |

It is certified that error appears in the above-identified patent and that said Letters Patent is hereby corrected as shown below:

Title page, item [71] Applicant's City of Residence "Guangdong (CN)" should read -- Shenzhen (CN) --.

Signed and Sealed this
Fifteenth Day of April, 2014

Michelle K. Lee
*Deputy Director of the United States Patent and Trademark Office*